United States Patent
Yamanouchi et al.

(10) Patent No.: US 6,734,225 B2
(45) Date of Patent: May 11, 2004

(54) COLORING COMPOSITION, INK FOR INK JET, AND INK JET RECORDING METHOD

(75) Inventors: Junichi Yamanouchi, Kanagawa (JP); Keizo Kimura, Kanagawa (JP); Takahiro Ishizuka, Kanagawa (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/780,402

(22) Filed: Feb. 12, 2001

(65) Prior Publication Data

US 2001/0020056 A1 Sep. 6, 2001

(30) Foreign Application Priority Data

Feb. 15, 2000 (JP) ........................... 2000-036547
Sep. 4, 2000 (JP) ........................... 2000-266964

(51) Int. Cl.$^7$ .................. C09D 11/10; C08K 5/3445; C08K 5/3472; C08K 5/3432; C08L 67/00; C08L 75/02; C08L 75/04; C08L 77/00

(52) U.S. Cl. .................. 523/160; 524/91; 524/94; 524/99; 524/102; 524/589; 524/601

(58) Field of Search ................ 523/160, 161; 106/31.43, 31.46, 31.49, 31.47; 524/86, 87, 91, 94, 99, 102, 106, 589, 601

(56) References Cited

U.S. PATENT DOCUMENTS

| 5,508,421 A | * 4/1996 | Suzuki et al. ............. 548/262.4 |
| 5,612,282 A | * 3/1997 | Komamura et al. ......... 503/227 |
| 6,025,412 A | * 2/2000 | Sacripante et al. ......... 523/161 |
| 6,031,019 A | * 2/2000 | Tsutsumi et al. ........... 523/160 |
| 6,313,196 B1 | * 11/2001 | Helling et al. .............. 523/160 |

FOREIGN PATENT DOCUMENTS

| JP | 56-157468 | 12/1981 |
| JP | 58-45272 | 3/1983 |
| JP | 03231975 A | * 10/1991 |
| JP | 4-18468 | 1/1992 |
| JP | 6-340835 | 12/1994 |
| JP | 7-268254 | 10/1995 |
| JP | 7-268257 | 10/1995 |
| JP | 7-268260 | 10/1995 |
| JP | 8-183920 | 7/1996 |
| JP | 9-59552 | 3/1997 |
| JP | 9-111163 | 4/1997 |
| JP | 9-255887 | 9/1997 |
| JP | 10-36728 | 2/1998 |
| JP | 10-110126 | 4/1998 |
| JP | 10-195355 | 7/1998 |

OTHER PUBLICATIONS

English Translation of JP 09059552 (1997).*
English Translation of JP 030231975 (1990).*

* cited by examiner

*Primary Examiner*—Callie Shosho
(74) *Attorney, Agent, or Firm*—Burns, Doane, Swecker & Mathis, L.L.P.

(57) ABSTRACT

An ink for an ink jet includes a coloring composition comprising a dispersion medium and coloring particulates containing an oil-soluble dye represented by formula (1) and a polymer selected from the group consisting of polyurethanes, polyesters, polyamides, polyureas and polycarbonates. The formula (1) satisfies at least one of following (i) to (v): (i) A represents $—NR^4R^5$, $R^4$ and $R^5$ each represents independently a $C_{1-18}$ alkyl group having a substituent group; (ii) At least one of $R^2$ and $R^7$ represents a substituted alkyl group; (iii) $R^8$ represents an aryl group having two or more substituent groups; (iv) Two or more substituent groups represented by $—NR^{170}SO_2R^{171}$ are present in the molecule; and (v) One or more carboxyl groups are present in the molecule.

Formula (1)

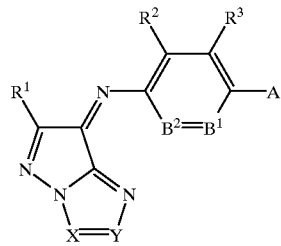

21 Claims, No Drawings

COLORING COMPOSITION, INK FOR INK JET, AND INK JET RECORDING METHOD

BACKGROUND OF THE INVENTION

1. Field of the Invention

The present invention relates to a water-based coloring composition containing an oil soluble dye (especially magenta dye), and to an ink for an ink jet which contains the coloring composition, and to an ink jet recording method using the ink for the ink jet. In particular, the present invention relates to a coloring composition whose color reproduction (especially magenta color reproduction) is good and which is suited for water based inks for writing, water based printing inks, inks for information recording, and the like, and to an ink for an ink jet which is suitable for a thermal, piezo-electric, electric field, or acoustic ink jet method, and to an ink jet recording method.

2. Description of the Related Art

In recent years, as use of computers has become more widespread, ink jet printers have become widely used not only in offices, but in homes as well, for printing on paper, film, cloth and the like. Oil based inks, water based inks, solid inks and the like are known as inks for ink jets. Among these, water based inks are advantageous from the standpoints of ease of production, usability, lack of odor, safety, and the like thereof, and therefore, water based inks are mainly used.

However, most water based inks use a water soluble dye which dissolves when in a molecular state. Thus, although there are great advantages with regard to transparency and color density, because the dye is water soluble, the water resistance thereof is poor. Problems arise in that when a water based ink is used for printing onto regular paper, bleeding occurs such that the quality of the printed product markedly deteriorates. Further, the light resistance is poor.

Water based inks using pigments or dispersed dyes in order to overcome these problems are proposed in, for example, Japanese Patent Application Laid-Open (JP-A) Nos. 56-157468, 4-18468, 8-183920, 10-110126, 10-195355 and the like.

However, with these water based inks, although the water resistance is improved to a certain extent, it is still insufficient. There are further problems in that the storage stability of the dispersion of the dispersed dye or pigment within the water based ink is lacking, and it is easy for clogging of the ink discharge ports to occur. Further, with these water based inks, generally, a sufficient hue cannot be obtained, and in particular, the hue of the cyan component is insufficient. Problems in color reproduction arise due to the insufficient color tone.

JP-A Nos. 58-45272, 6-340835, 7-268254, 7-268257, and 7-268260 disclose a method of encapsulating a dye in urethane or polyester dispersion particles.

However, in such cases, the color reproduction is insufficient due to the insufficient color tone. Further, the dispersion stability and water resistance of the dye encapsulating polymer substance, when a dye is encapsulated to a desired concentration, are not always sufficient.

JP-A Nos. 9-59552, 9-111163, 9-255887, and 10-36728 propose improving the color tone by using a colorant in which an aromatic diamine is coupled with a pyrazolotriazole.

However, in these cases, there are problems in that the color tone changes depending on the type of image receiving paper, and the water resistance is insufficient.

SUMMARY OF THE INVENTION

The present invention overcomes the above-described drawbacks, and achieves the following objects. The present invention provides a coloring composition which has excellent dispersion stability of the coloring particulates, has excellent color forming property and excellent color tone (especially magenta color reproduction) when printing onto any type of paper regardless of the paper type, has excellent water resistance and light resistance, and is suitable for use as a water based ink for writing, a water based printing ink, an ink for information recording, or the like. The present invention also provides an ink for an ink jet which is suited for a thermal, piezo-electric, electric field or acoustic ink jet method, which does not cause clogging of a nozzle tip when printing is carried out using nozzles, and which has excellent color forming property and excellent color tone (especially magenta color reproduction) when printing onto any type of paper regardless of paper type, and has excellent water resistance and light resistance, and to an ink jet recording method.

In a first aspect of the present invention, there is provided an ink for an ink jet, said ink comprising a coloring composition comprising a dispersion medium and coloring particulates comprising a polymer which is selected from the group consisting of polyurethanes, polyesters, polyamides, polyureas and polycarbonates; and an oil-soluble dye represented by formula (1):

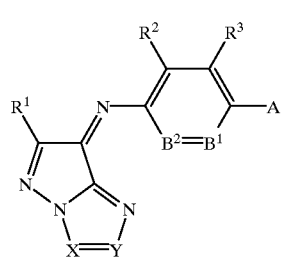

Formula (1)

wherein $R^1$ represents a hydrogen atom, aliphatic group, aromatic group, heterocyclic group, cyano, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$ or —$NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each represents independently a hydrogen atom, aliphatic group or aromatic group; wherein A represents —$NR^4R^5$ or a hydroxyl group, and $R^4$ and $R^5$ each represents independently a hydrogen atom, aliphatic group, aromatic group or heterocyclic group; wherein $B^1$ represents =$C(R^6)$— or =N— and $B^2$ represents —$C(R^7)$= or —N=; wherein $R^2$, $R^3$, $R^6$ and $R^7$ each represents independently a hydrogen atom, halogen atom, aliphatic group, aromatic group, heterocyclic group, cyano, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$, and $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each represents independently a hydrogen atom, aliphatic group or aromatic group; wherein $R^2$ and $R^3$, $R^3$ and $R^4$, $R^4$ and $R^5$, $R^5$ and $R^6$, or $R^6$ and $R^7$ may be mutually bound to form a ring; wherein X and Y each represents independently C(R$^8$)= or N=, R$^8$ represents a hydrogen atom, aliphatic group or aromatic group, either X or Y shall represent N=, and X and Y shall not be simultaneously —N=; and wherein the formula (1) satisfies at least one of following (i) to (v):

(i) A represents —NR$^4$R$^5$, R$^4$ and R$^5$ each represents independently a C$_{1-18}$ alkyl group having a substituent group, the substituent group is at least one member selected from the group consisting of a heterocyclic group, cyano, —OR$^{141}$, —SR$^{142}$, —CO$_2$R$^{143}$, —OCOR$^{144}$, —NR$^{145}$R$^{146}$, —CONR$^{147}$R$^{148}$, —SO$_2$R$^{149}$, —SO$_2$NR$^{150}$R$^{151}$, —NR$^{152}$CONR$^{153}$R$^{154}$, —NR$^{155}$CO$_2$R$^{156}$, —COR$^{157}$, —NR$^{158}$COR$^{159}$ and —NR$^{160}$SO$_2$R$^{161}$, and R$^{141}$, R$^{142}$, R$^{143}$, R$^{144}$, R$^{145}$, R$^{146}$, R$^{147}$, R$^{148}$, R$^{149}$, R$^{150}$, R$^{151}$, R$^{152}$, R$^{153}$, R$^{154}$, R$^{155}$, R$^{156}$, R$^{157}$, R$^{158}$, R$^{159}$, R$^{160}$ and R$^{161}$ each represents independently a hydrogen atom, aliphatic group or aromatic group;

(ii) R$^2$ represents a substituted alkyl group;

(ii)' R$^7$ represents a substituted alkyl group;

(iii) R$^8$ represents an aryl group having 2 or more substituent groups;

(iv) Two or more substituent groups represented by —NR$^{170}$SO$_2$R$^{171}$ are present in the molecule, and R$^{170}$ and R$^{171}$ each represents independently a hydrogen atom, aliphatic group or aromatic group; and (v) One or more carboxyl groups are present in the molecule.

In a second aspect of the present invention, there is provided a coloring composition, said coloring composition comprising a dispersion medium and coloring particulates comprising a polymer which is selected from the group consisting of polyurethanes, polyesters, polyamides, polyureas and polycarbonates; and an oil-soluble dye represented by said formula (1).

In a third aspect of the present invention, there is provided an ink jet recording method, said method comprising the steps of (a) preparing an ink for an ink jet and (b) using the ink for recording in an ink-jet printing device, wherein the ink comprising a coloring composition comprising a dispersion medium and coloring particulates containing a polymer selected from the group consisting of polyurethanes, polyesters, polyamides, polyureas and polycarbonates; and an oil-soluble dye represented by said formula (1).

DESCRIPTION OF THE PREFERRED EMBODIMENTS

The coloring composition, the ink for an ink jet, and the ink jet recording method of the present invention will be described hereinafter.

[Coloring Composition]

The coloring composition of the present invention comprises coloring particulates containing an oil-soluble dye and a polymer dispersed in a dispersion medium. The dispersion medium is preferably a water-based medium. The water-based medium means a liquid containing at least water.

Oil-soluble Dye

The oil-soluble dye is preferably a compound represented by formula (1).

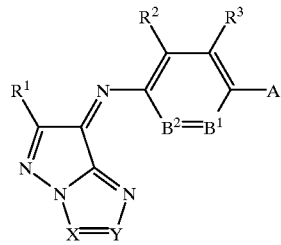

Formula (1)

In the formula (1) above, R$^1$ represents a hydrogen atom, aliphatic group, aromatic group, heterocyclic group, cyano, —OR$^{11}$, —SR$^{12}$, —CO$_2$R$^{13}$, —OCOR$^{14}$, —NR$^{15}$R$^{16}$, —CONR$^{17}$R$^{18}$, —SO$_2$R$^{19}$, —SO$_2$NR$^{20}$R$^{21}$, —NR$^{22}$CONR$^{23}$R$^{24}$, —NR$^{25}$CO$_2$R$^{26}$, —COR$^{27}$, —NR$^{28}$COR$^{29}$ or —NR$^{30}$SO$_2$R$^{31}$; and R$^{11}$, R$^{12}$, R$^{13}$, R$^{14}$, R$^{15}$, R$^{16}$, R$^{17}$, R$^{18}$, R$^{19}$, R$^{20}$, R$^{21}$, R$^{22}$, R$^{23}$, R$^{24}$, R$^{25}$, R$^{26}$, R$^{27}$, R$^{28}$, R$^{29}$, R$^{30}$ and R$^{31}$ each represents independently a hydrogen atom, aliphatic group or aromatic group.

In particular, R$^1$ is preferably a hydrogen atom, aliphatic group, aromatic group, —OR$^{11}$, —SR$^{12}$, —NR$^{15}$R$^{16}$, —SO$_2$R$^{19}$, —NR$^{22}$CONR$^{23}$R$^{24}$, —NR$^{25}$CO$_2$R$^{26}$, —NR$^{28}$COR$^{29}$ or —NR$^{30}$SO$_2$R$^{31}$, more preferably a hydrogen atom, aliphatic group, aromatic group, —OR$^{11}$ or —NR$^{15}$R$^{16}$, further preferably a hydrogen atom, alkyl group, substituted alkyl group, aryl group, substituted aryl group, alkoxy group, substituted alkoxy group, phenoxy group, substituted phenoxy group, dialkyl amino group or substituted dialkyl amino group, particularly preferably a hydrogen atom, C$_{1-10}$ alkyl group, C$_{1-10}$ substituted alkyl group, C$_{6-10}$ aryl group or C$_{6-10}$ substituted aryl group, most preferably a hydrogen atom, C$_{1-6}$ alkyl group or C$_{1-6}$ substituted alkyl group.

The aliphatic group includes an alkyl group, substituted alkyl group, alkenyl group, substituted alkenyl group, alkynyl group, substituted alkynyl group, aralkyl group and substituted aralkyl group.

The alkyl group may be straight-chain or branched one or may have formed a ring. The number of carbon atoms in the alkyl group is preferably 1 to 20, more preferably 1 to 18.

The alkyl moiety in the substituted alkyl group is the same as the above-defined alkyl group.

The alkenyl group may be straight-chain or branched one or may have formed a ring. The number of carbon atoms in the alkenyl group is preferably 2 to 20, more preferably 2 to 18.

The alkenyl moiety in the substituted alkenyl group is the same as the above-defined alkenyl group.

The alkynyl group may be straight-chain or branched one or may have formed a ring. The number of carbon atoms in the alkynyl group is preferably 2 to 20, more preferably 2 to 18.

The alkynyl moiety in the substituted alkynyl group is the same as the above-defined alkynyl group.

The alkyl moiety in the aralkyl group and substituted aralkyl group is the same as the above-defined alkyl group. The aryl moiety in the aralkyl group and substituted aralkyl group is preferably phenyl or naphthyl, particularly preferably phenyl.

Substituent groups on the alkyl moieties in the substituted alkyl group, substituted alkenyl group, substituted alkynyl group and substituted aralkyl group described above include e.g. a halogen atom, cyano, nitro, heterocyclic group, —OR$^{111}$, —SR$^{112}$, —CO$_2$R$^{113}$, —NR$^{114}$R$^{115}$, —$CONR^{116}R^{117}$, —$SO_2R^{118}$ and —$SO_2NR^{119}R^{120}$ etc. $R^{111}$, $R^{112}$, $R^{113}$, $R^{114}$, $R^{115}$, $R^{116}$, $R^{117}$, $R^{118}$, $R^{119}$ and $R^{120}$ each represents independently a hydrogen atom, aliphatic group or aromatic group. Substituent groups on the aryl moiety in the substituted aralkyl group include a halogen atom, cyano, nitro, aliphatic group, heterocyclic group, —$OR^{121}$, —$SR^{122}$, —$CO_2R^{123}$, —$NR^{124}R^{125}$, —$CONR^{126}R^{127}$, —$SO_2R^{128}$ or —$SO_2NR^{129}R^{130}$ etc. $R^{121}$, $R^{122}$, $R^{123}$, $R^{124}$, $R^{125}$, $R^{126}$, $R^{127}$, $R^{128}$, $R^{129}$ and $R^{130}$ each represents independently a hydrogen atom, aliphatic group or aromatic group.

The aromatic group includes to an aryl group and substituted aryl group. The aryl group is preferably phenyl or naphthyl, particularly preferably phenyl.

The aryl moiety in the substituted aryl group is the same as above-defined aryl group.

The heterocyclic group preferably includes 5- or 6-memberred saturated or unsaturated heterocyclic groups, and these heterocyclic groups may further have an aliphatic ring, aromatic ring or other heterocyclic ring condensed therewith.

Examples of heteroatoms in the heterocyclic ring include B, N, O, S, Se and Te. The heteroatoms are preferably N, O and S.

The heterocyclic ring is preferably a ring whose carbon atom has free valence (monovalence) (the heterocyclic group is bound at the carbon atom).

Examples of the saturated heterocyclic ring include a pyrrolidine ring, morpholine ring, 2-bora-1,3-dioxolan ring, and 1,3-thiazolidine ring.

Examples of the unsaturated heterocyclic ring include an imnidazole ring, thiazole ring, benzothiazole ring, benzoxazole ring, benzotriazole ring, benzoselenazole ring, pyridine ring, pyrimidine ring and quinoline ring.

The heterocyclic group may have a substituent group, and the substituent group includes e.g. a halogen atom, cyano, nitro, aliphatic group, aromatic group, heterocyclic group, —$OR^{131}$, —$SR^{132}$, —$CO_2R^{133}$, —$NR^{134}R^{135}$, —$CONR^{136}R^{137}$, —$SO_2R^{138}$ and —$SO_2NR^{139}R^{140}$ etc. $R^{131}$, $R^{132}$, $R^{133}$, $R^{134}$, $R^{135}$, $R^{136}$, $R^{137}$, $R^{138}$, $R^{139}$ and $R^{140}$ each represents independently a hydrogen atom, aliphatic group or aromatic group.

In the formula (1) above, A represents —$NR^4R^5$ or a hydroxyl group. A is preferably —$NR^4R^5$.

In the formula (1) above, $R^4$ and $R^5$ each represents independently a hydrogen atom, aliphatic group, aromatic group or heterocyclic group. In particular, each of $R^4$ and $R^5$ is preferably a hydrogen atom or aliphatic group, more preferably a hydrogen atom, alkyl group or substituted alkyl group, particularly preferably a hydrogen atom, $C_{1-18}$ alkyl group or $C_{1-18}$ substituted alkyl group.

In particular, $R^4$ and $R^5$ each preferably represents independently a $C_{1-18}$ alkyl group having a substituent group, and the substituent group is more preferably at least one member selected from a heterocyclic group, cyano, —$OR^{141}$, —$SR^{142}$, $CO_2R^{143}$, —$OCOR^{144}$, —$NR^{145}R^{146}$, —$CONR^{147}R^{148}$, —$SO_2R^{149}$, —$SO_2NR^{150}R^{151}$, —$NR^{152}CONR^{153}R^{154}$, —$NR^{155}CO_2R^{156}$, —$COR^{157}$, —$NR^{158}COR^{159}$ and —$NR^{160}SO_2R^{161}$. Here, $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each represents independently a hydrogen atom, aliphatic group or aromatic group.

Among substituent groups on $R^4$ and $R^5$, more preferable substituent groups are at least one member selected from cyano, —$OR^{141}$, —$SR^{142}$, —$CO_2R^{143}$, —$OCOR^{144}$, —$CONR^{147}R^{148}$, —$SO_2R^{149}$, —$SO_2NR^{150}R^{151}$, $NR^{152}CONR^{153}R^{154}$, —$NR^{155}CO_2R^{156}$, —$COR^{157}$, —$NR^{158}COR^{159}$ and —$NR^{160}SO_2R^{161}$, particularly preferably at least one member selected from cyano, —$OR^{141}$, —$CO_2R^{143}$, —$OCOR^{144}$ and —$NR^{160}SO_2R^{161}$. When the substituent groups are —$OR^{141}$, the number of such substituent groups in both $R^4$ and $R^5$ is 2 or more, preferably 2 to 4, and more preferably the number of such substituent groups in each of $R^4$ and $R^5$ is 2 or more. The most preferable substituent groups on $R^4$ and $R^5$ are at least one member selected from cyano and —$CO_2R^{143}$.

In the formula (1) above, $B^1$ represents $=C(R^6)$— or $=N$—, and $B^2$ represents —$C(R^7)=$ or —$N=$. In particular, it is preferable that $B^1$ and $B^2$ are simultaneously not —$N=$, and it is more preferable that $B^1$ is $=C(R^6)$— and simultaneously $B^2$ is —$C(R^7)=$.

$R^2$, $R^3$, $R^6$ and $R^7$ each represents independently a hydrogen atom, halogen atom, aliphatic group, aromatic group, heterocyclic group, cyano, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, $COR^{67}$, $NR^{68}COR^{69}$ or —$NR^{70}SO_2R^{71}$. $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each represents independently a hydrogen atom, aliphatic group or aromatic group.

In particular, each of $R^2$ and $R^7$ is preferably a hydrogen atom, halogen atom, aliphatic group, —$OR^{51}$, —$NR^{62}CONR^{63}R^{64}$, —$NR^{65}CO_2R^{66}$, —$NR^{68}COR^{69}$ or —$NR^{70}SO_2R^{71}$, more preferably a hydrogen atom, fluorine atom, chlorine atom, alkyl group, substituted alkyl group, —$NR^{62}CONR^{63}R^{64}$ or —$NR^{68}COR^{69}$, more preferably a hydrogen atom, chlorine atom, $C_{1-10}$ alkyl group or $C_{1-10}$ substituted alkyl group, most preferably a hydrogen atom, $C_{1-4}$ alkyl group or $C_{1-4}$ substituted alkyl group.

In particular, each of $R^2$ and $R^7$ is preferably a substituent alkyl group, more preferably a trifluoromethyl group. A substituent group on the substituted alkyl group are preferably a halogen atom, more preferably a fluorine atom.

Each of $R^3$ and $R^6$ is preferably a hydrogen atom, halogen atom or aliphatic group, more preferably a hydrogen atom, fluorine atom, chlorine atom, alkyl group or substituted alkyl group, further preferably a hydrogen atom, chlorine atom, $C_{1-10}$ alkyl group or substituted $C_{1-10}$ alkyl group, most preferably a hydrogen atom, $C_{1-4}$ alkyl group, or $C_{1-4}$ substituted alkyl group.

$R^2$ and $R^3$, $R^3$ and $R^4$, $R^4$ and $R^5$, $R^5$ and $R^6$, or $R^6$ and $R^7$ may be mutually bound to form a ring. The combination of $R^3$ and $R^4$, $R^4$ and $R^5$, or $R^5$ and $R^6$ is preferable for forming a ring.

The ring formed by $R^2$ and $R^3$ or $R^6$ and $R^7$ is preferably a 5- or 6-memberred ring, and the ring is preferably an aromatic ring (e.g., a benzene ring) or an unsaturated heterocyclic ring (e.g., a pyridine ring, imidazole ring, thiazole ring, pyrimidine ring, pyrrole ring and furan ring).

The ring formed by $R^3$ and $R^4$ or $R^5$ and $R^6$ is preferably a 5- or 6-memberred ring, and the ring includes a tetrahydroquinoline ring and dihydroindole ring.

The ring formed by $R^4$ and $R^5$ is preferably a 5- or 6-memberred ring, and the ring includes a pyrrolidine ring, piperidine ring or morpholine ring.

X and Y each represents independently $C(R^8)=$ or $N=$. Either X or Y shall represent $N=$, and X and Y shall not be simultaneously —$N=$. The combination of X and Y is more preferably a combination wherein X is —$N=$ and Y is —$C(R^8)=$.

$R^8$ represents a hydrogen atom, aliphatic group or aromatic group, and is preferably a hydrogen atom, alkyl group, substituted alkyl group, aryl group or substituted aryl group, more preferably a hydrogen atom, $C_{1-150}$ substituted alkyl group or $C_{6-150}$ substituted aryl group, most preferably $C_{1-100}$ substituted alkyl group or $C_{6-100}$ substituted aryl group. When $R^8$ is a substituted aryl group, it preferably has two or more substituent groups and is more preferably a 3,4- or 3,5-disubstituted phenyl group, particularly preferably a 3,5-disubstituted phenyl group.

The oil-soluble dye represented by the formula (1) above has 2 or more substituent groups per molecule of the dye, more preferably 2 to 5 substituent groups and most preferably 2 to 3 substituent groups represented by $-NR^{170}SO_2R^{171}$. $R^{170}$ and $R^{171}$ each represents independently a hydrogen atom, aliphatic group or aromatic group. In particular, $R^{170}$ is preferably a hydrogen atom or aliphatic group, particularly preferably a hydrogen atom.

The oil-soluble dye represented by the formula (1) above also has preferably one or more water-soluble groups in the molecule. The water-soluble groups include ionic hydrophilic groups such as carboxyl group, quaternary ammonium group and sulfonic acid group, among which the carboxyl group is particularly preferable.

The oil-soluble dye represented by the formula (1) described above in the present invention satisfies at least one of (i) to (v) below:

(i) A represents $-NR^4R^5$, and $R^4$ and $R^5$ each represents independently a $C_{1-18}$ alkyl group having a substituent group, and the substituent group is at least one member selected from a heterocyclic group, cyano, $-OR^{141}$, $-SR^{142}$, $-CO_2R^{143}$, $-OCOR^{144}$, $-NR^{145}R^{146}$, $-CONR^{147}R^{148}$, $-SO_2R^{149}$, $-SO_2NR^{150}R^{151}$, $-NR^{152}CONR^{153}R^{154}$, $-NR^{155}CO_2R^{156}$, $-COR^{157}$, $-NR^{158}COR^{159}$ and $-NR^{160}SO_2R^{161}$; and $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each represents independently a hydrogen atom, aliphatic group or aromatic group;

(ii) $R^2$ represents a substituted alkyl group;

(ii)' $R^7$ represents a substituted alkyl group;

(iii) $R^8$ is an aryl group having 2 or more substituent groups (these substituent groups refer to substituent groups on the aryl group);

(iv) Two or more substituent groups represented by $-NR^{170}SO_2R^{171}$ are present in the molecule, and $R^{170}$ and $R^{171}$ each represents independently a hydrogen atom, aliphatic group or aromatic group; and (v) One or more carboxyl groups are present in the molecule.

The compounds represented by the formula (1) above are preferably those represented by any one of the formulae (2-1) to (2-5).

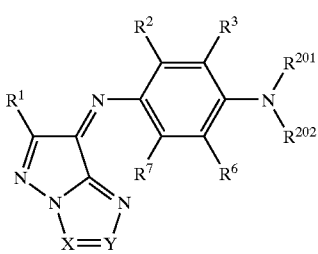

(2-1)

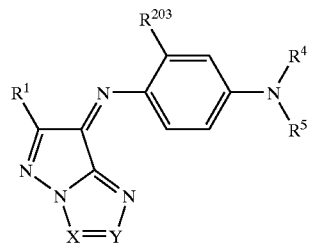

(2-2)

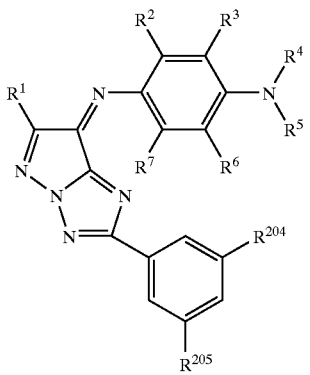

(2-3a)

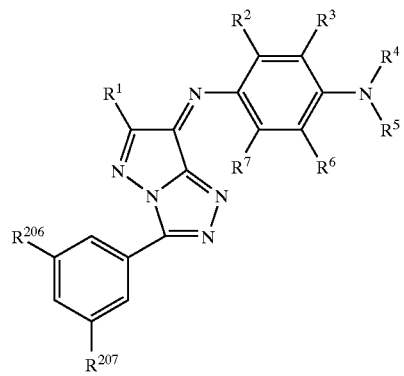

(2-3b)

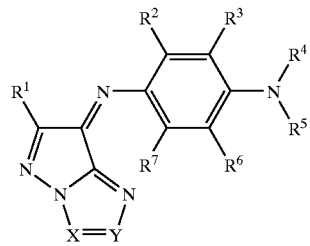

(2-4)

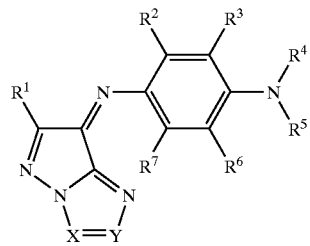

(2-5)

In the formulae (2-1) to (2-5), X, Y, $R^1$, $R^2$, $R^3$, $R^4$, $R^5$, $R^6$, $R^7$ and $R^8$ have the same meanings as defined above in the formula (1). In the formulae (2-1), (2-2), (2-4) and (2-5), it is more preferable that X is $-N=$ and Y is $-C(R^8)=$, and the formula (2-3a) is more preferable than (2-3b).

In the formula (2-1) above, $R^{201}$ and $R^{202}$ each represents independently a $C_{1-18}$ alkyl group having a substituent group, and the substituent group is at least one member selected from a heterocyclic group, cyano, $-OR^{141}$, $-SR^{142}$, $-CO_2R^{143}$, $-OCOR^{144}$, $-NR^{145}R^{146}$, $-CONR^{147}R^{148}$, $-SO_2R^{149}$, $-SO_2NR^{150}R^{151}$, $-NR^{152}CONR^{153}R^{154}$, $-NR^{155}CO_2R^{156}$, $-COR^{157}$, $-NR^{158}COR^{159}$ and $-NR^{160}SO_2R^{161}$. Here, $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each represents independently a hydrogen atom, aliphatic group or aromatic group.

The substituent groups on $R^{201}$ an $R^{202}$ are preferably cyano, $-OR^{141}$, $-SR^{142}$, $-CO_2R^{143}$, $-OCOR^{144}$, $-CONR^{147}R^{148}$, $-SO_2R^{149}$, $-SO_2NR^{150}R^{151}$, $-NR^{152}CONR^{153}R^{154}$, $-NR^{155}CO_2R^{156}$, $-COR^{157}$, $-NR^{158}COR^{159}$ or $-NR^{160}SO_2R^{161}$, more preferably cyano, $-OR^{141}$, $-CO_2R^{143}$, $-OCOR^{144}$ or $-NR^{160}SO_2R^{161}$, particularly preferably cyano or $-CO_2R^{143}$. When the substituent groups are $-OR^{141}$, the number of such substituent groups in both $R^{201}$ and $R^{202}$ is 2 or more, preferably 2 to 4, and more preferably the number of such substituent groups in each of $R^{201}$ and $R^{202}$ is 2 or more.

In the formula (2-2) above, $R^{203}$ represents a $C_{1-10}$ substituted alkyl group. The substituted alkyl group is preferably a $C_{1-4}$ substituted alkyl group, more preferably a trifluoromethyl group. The substituent group is preferably a halogen atom, more preferably a fluorine atom.

In the formulae (2-3a) and (2-3b) above, $R^{204}$, $R^{205}$, $R^{206}$ and $R^{207}$ each represents independently a cyano or a group having no more than $C_{100}$ selected from the group consisting of an aliphatic group, aromatic group, heterocyclic group, $-OR^{241}$, $-SR^{242}$, $-CO_2R^{243}$, $-OCOR^{244}$, $-NR^{245}R^{246}$, $-CONR^{247}R^{248}$, $-SO_2R^{249}$, $-SO_2NR^{250}R^{251}$, $-NR^{252}CONR^{253}R^{254}$, $-NR^{255}CO_2R^{256}$, $-COR^{257}$, $-NR^{258}COR^{259}$ and $-NR^{260}SO_2R^{261}$. The number of carbon atoms in the aliphatic group is preferably 50 or less. $R^{241}$, $R^{242}$, $R^{243}$, $R^{244}$, $R^{245}$, $R^{246}$, $R^{247}$, $R^{248}$, $R^{249}$, $R^{250}$, $R^{251}$, $R^{252}$, $R^{253}$, $R^{254}$, $R^{255}$, $R^{256}$, $R^{257}$, $R^{258}$, $R^{259}$, $R^{260}$ and $R^{261}$ each represents independently a hydrogen atom, aliphatic group or aromatic group. In particular, $R^{204}$, $R^{205}$, $R^{206}$ and $R^{207}$ are preferably a group having no more than $C_{30}$ selected from the group consisting of an aliphatic group, aromatic group, heterocyclic group, $-OR^{241}$, $-CO_2R^{243}$, $-OCOR^{244}$, $-CONR^{247}R^{248}$, $-SO_2NR^{250}R^{251}$, $-NR^{252}CONR^{253}R^{254}$, $-NR^{255}CO_2R^{256}$, $-COR^{257}$, $-NR^{258}COR^{259}$ and $-NR^{260}SO_2R^{261}$. Further, $R^{204}$, $R^{205}$, $R^{206}$ and $R^{207}$ are more preferably a group having no more than $C_{30}$ selected from the group consisting of an aliphatic group, $-OR^{241}$, $-CO_2R^{243}$, $-OCOR^{244}$, $-CONR^{247}R^{248}$, $-NR^{258}COR^{259}$ and $-NR^{260}SO_2R^{261}$.

In the formula (2-4) above, $R^1$, $R^2$, $R^3$, $R^4$, $R^5$, $R^6$, $R^7$ or $R^8$ has substituent groups represented by $-NR^{271}SO_2R^{272}$, and two or more substituent groups represented by $-NR^{271}SO_2R^{272}$ are contained in the molecule. The number of the $-NR^{271}SO_2R^{272}$ groups in the molecule is preferably 2 to 5, more preferably 2 to 3. $R^{271}$ and $R^{272}$ each represents independently a hydrogen atom, aliphatic group or aromatic group. $R^{271}$ is preferably a hydrogen atom or aliphatic group, particularly preferably a hydrogen atom.

In the formula (2-5) above, at least one of $R^1$, $R^2$, $R^3$, $R^4$, $R^5$, $R^6$, $R^7$ and $R^8$ has one or more water-soluble groups. The water-soluble groups include e.g. ionic hydrophilic groups such as carboxyl group, quaternary ammonium group and sulfonic acid group, among which the carboxyl group is particularly preferable.

Use of those compounds represented by any one of the formulae (2-1), (2-2), (2-3a), (2-3b), (2-4) and (2-5) above in one embodiment is preferable for dispersion stability with time. Use of those compounds represented by the formula (2-1) above in the another embodiment is preferably for lower absorption at 600 nm and advantageous for reducing smears on paper upon printing. Use of those compounds represented by the formula (2-2) above in another embodiment is preferable for achieving images superior in heat resistance. Use of those compounds represented by the formulae (2-3a) and (2-3b) above in another embodiment preferable for attaining sharp hues excellent in spectral absorption characteristics. Use of those compounds represented by the formula (2-4) above in another embodiment is preferable for dispersion stability and thermostability. Use of those compounds represented by the formula (2-5) above in another embodiment is preferable for attaining a dispersion of small particles.

Hereinafter, the examples (I-1 to I-53) of those compounds (azomethine coloring matter) represented by the formula (1) above are enumerated.

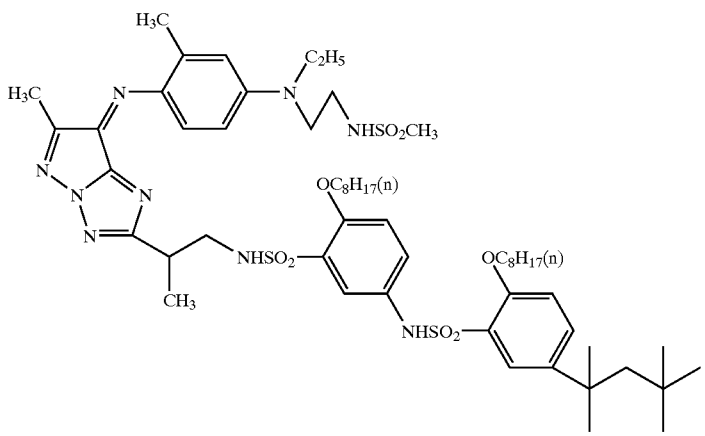

I-1)

-continued
I-2)
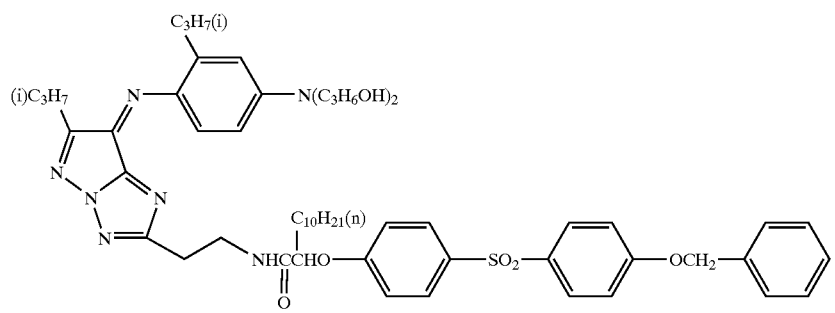
I-3)
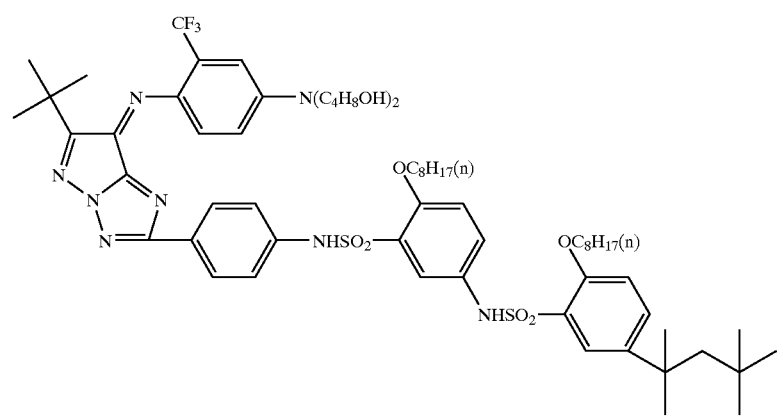
I-4)
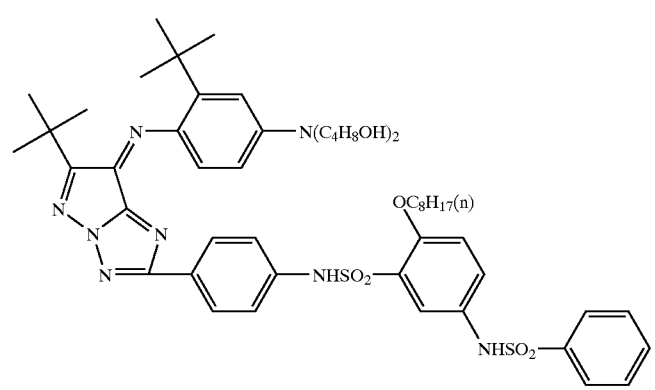
I-5)
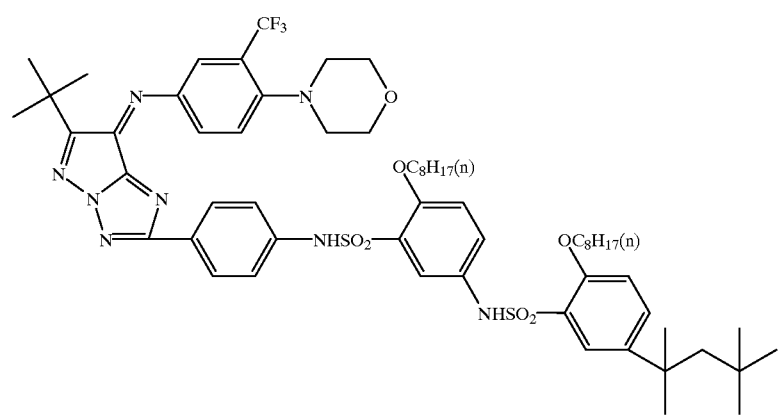

-continued
I-6)
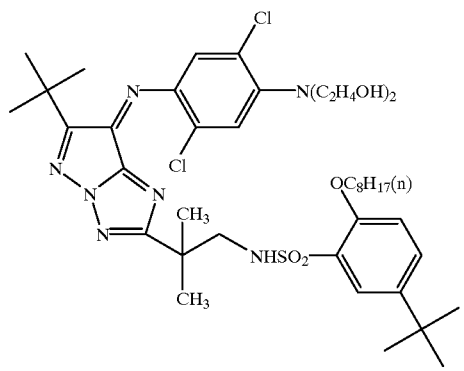
I-7)
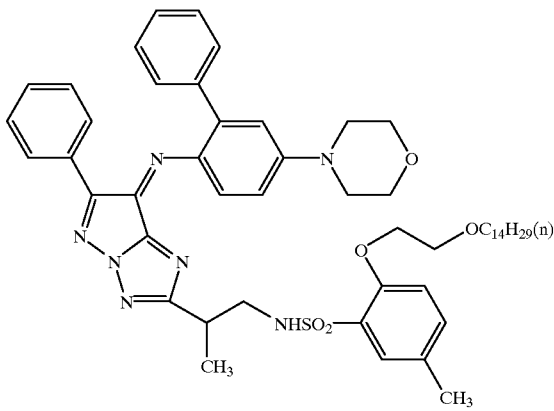
I-8)
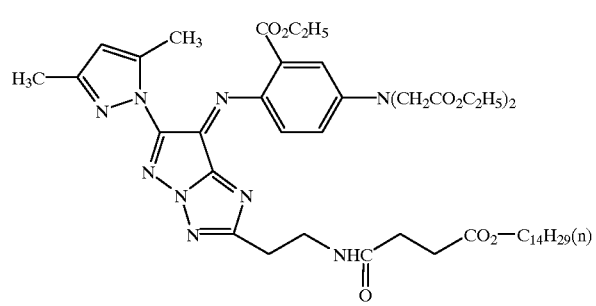
I-9)
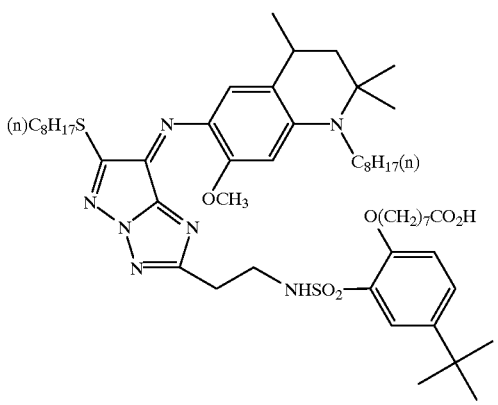
I-10)
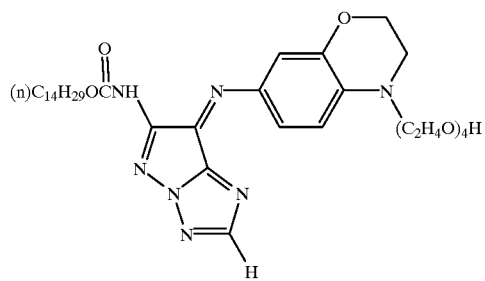
I-11)
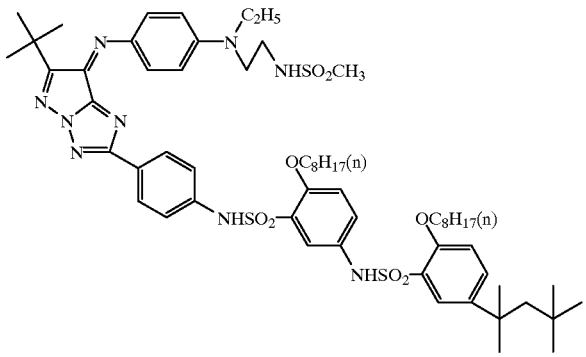
I-12)
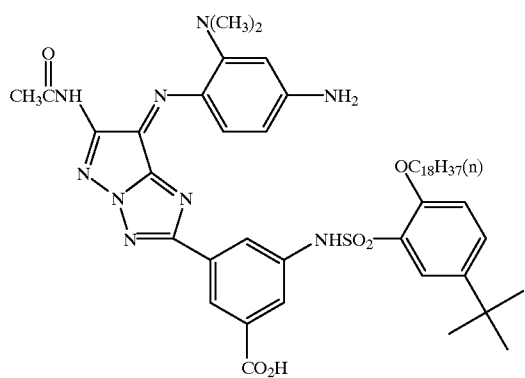
I-13)
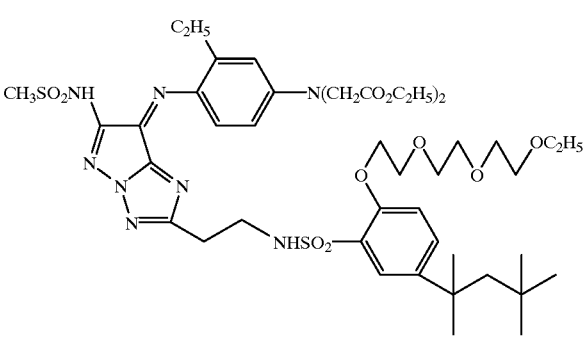

I-14)
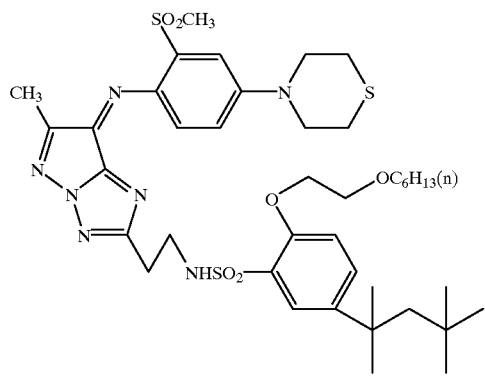
I-15)
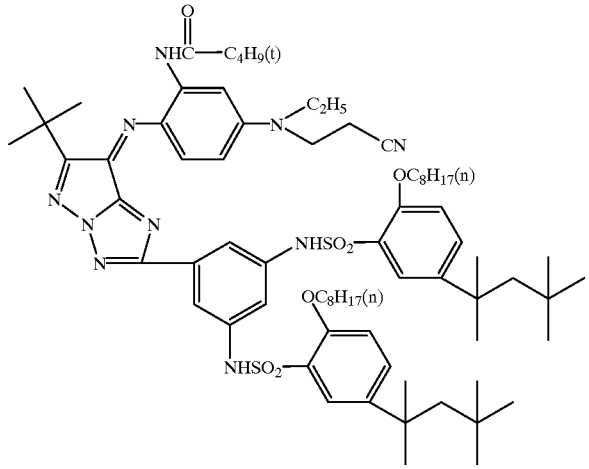
I-16)
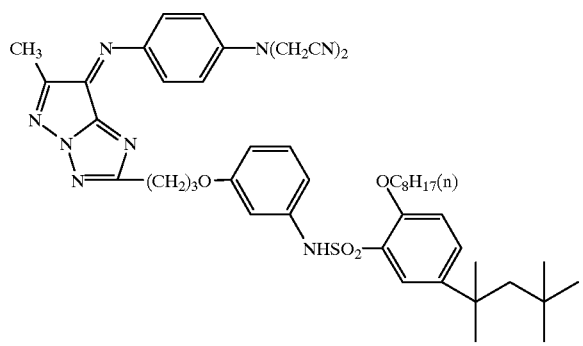
I-17)
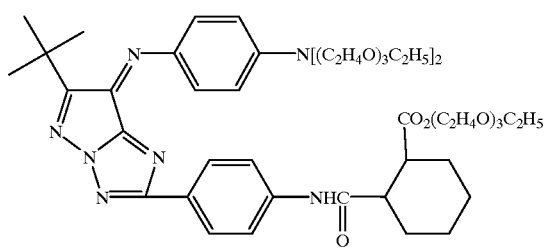
I-18)
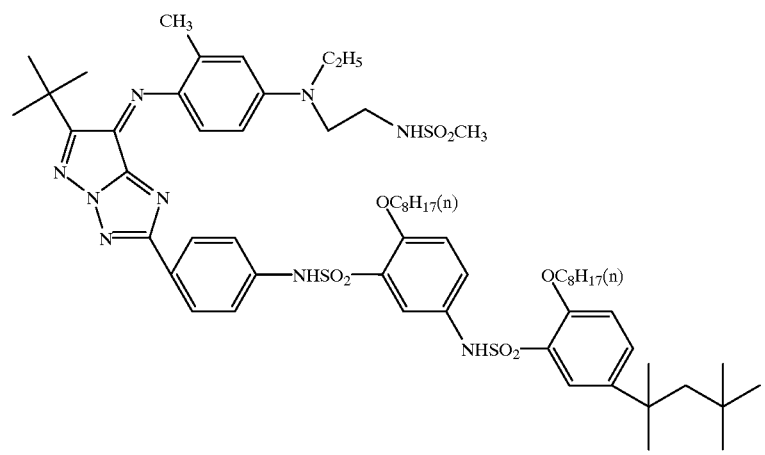

-continued
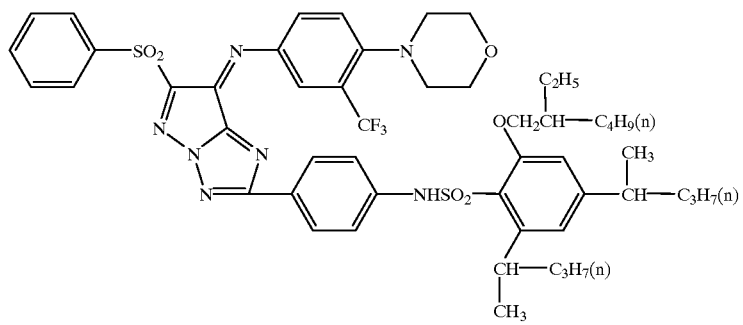
I-19)
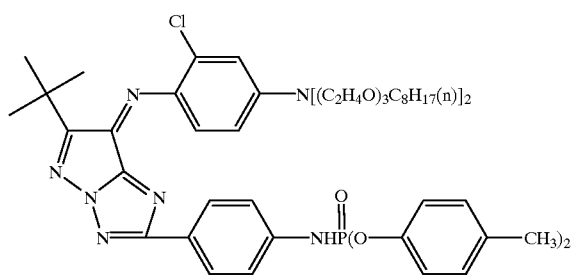
I-20)
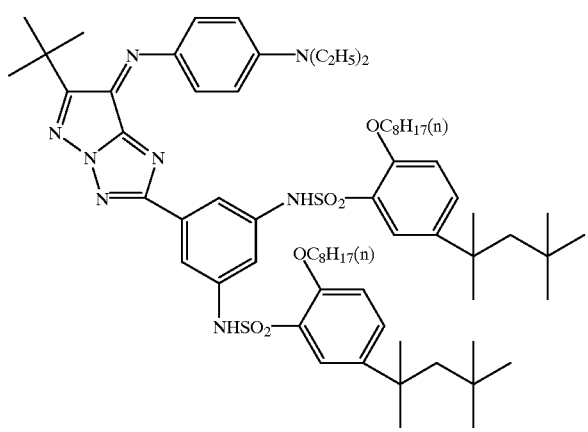
I-21)
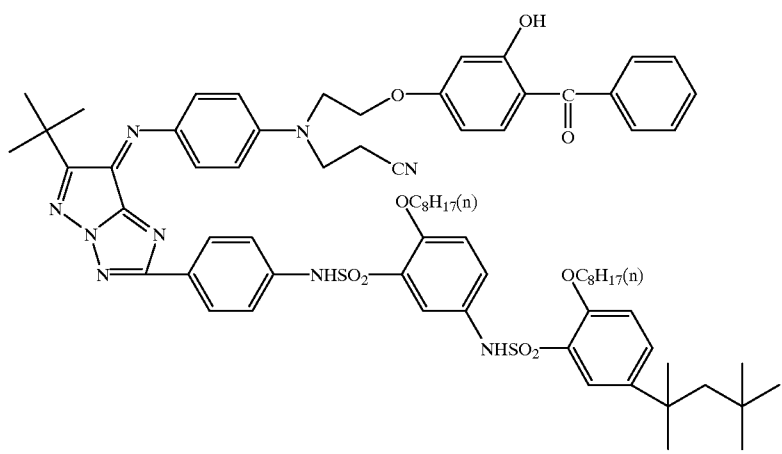
I-22)
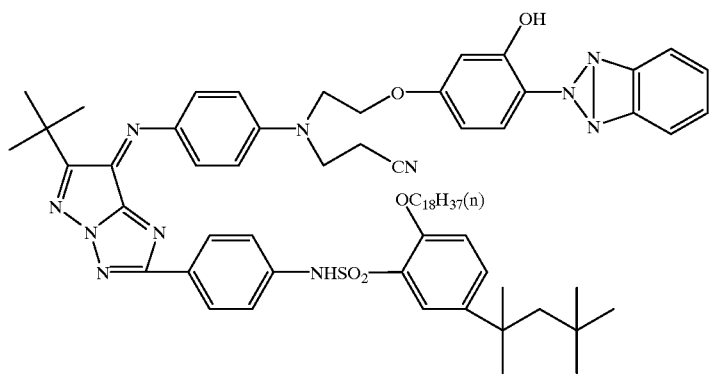
I-23)

I-24)
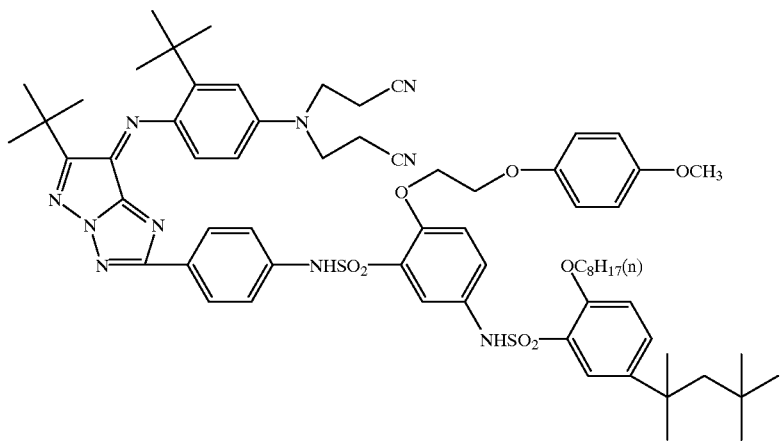
I-25)
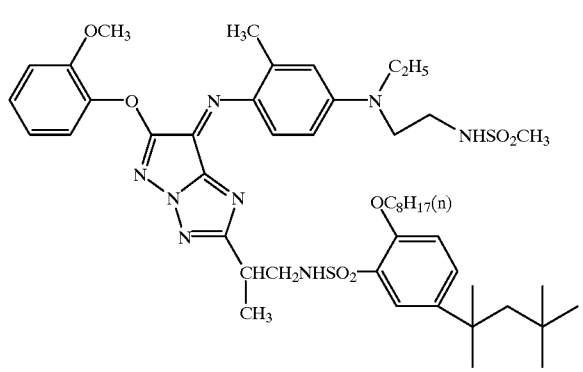
I-26)
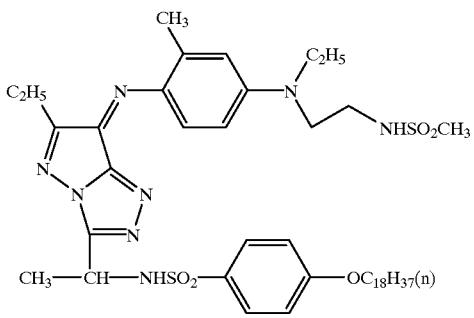
I-27)
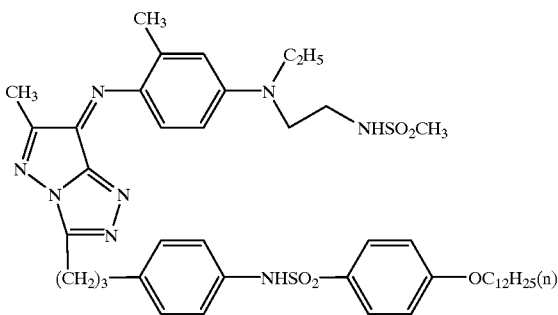
I-28)
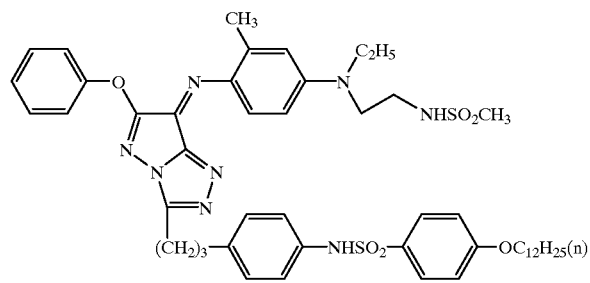

-continued
I-29)
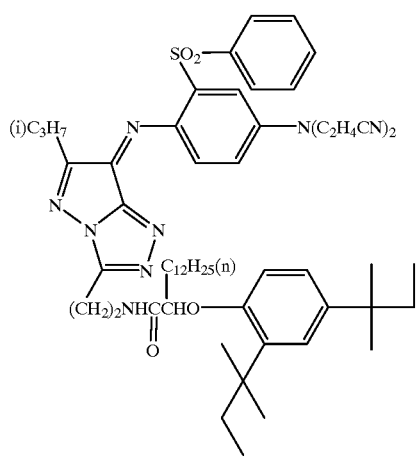
I-30)
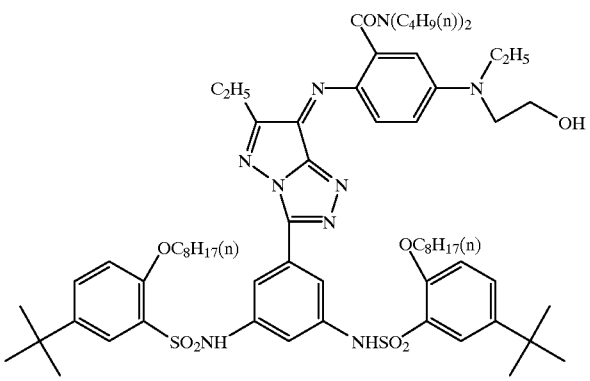
I-31)
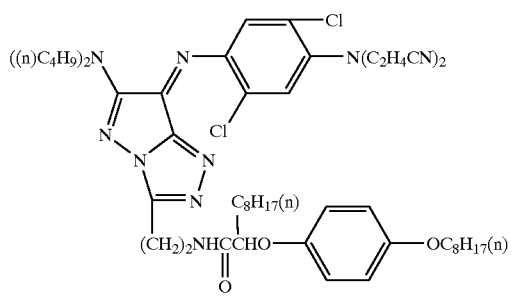
I-32)
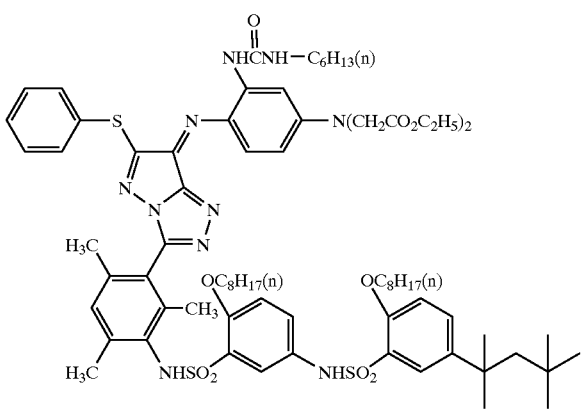
I-33)
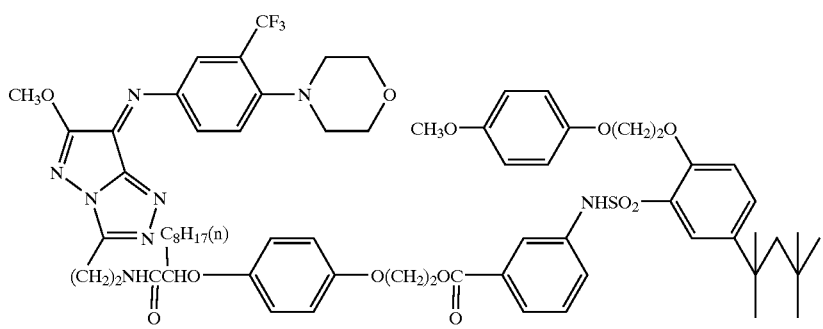
I-34)
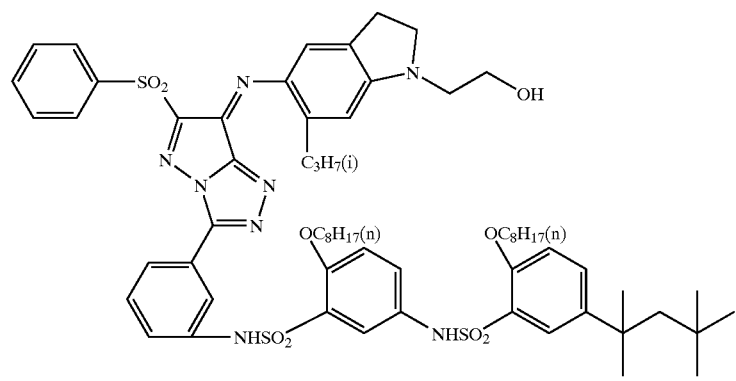

I-35)
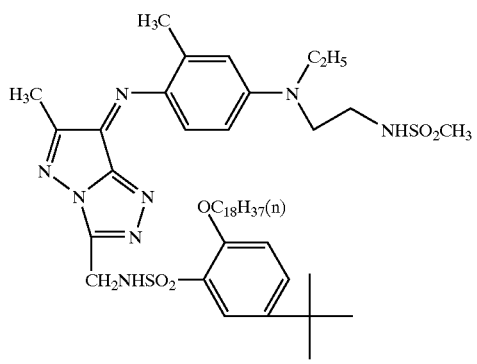
I-36)
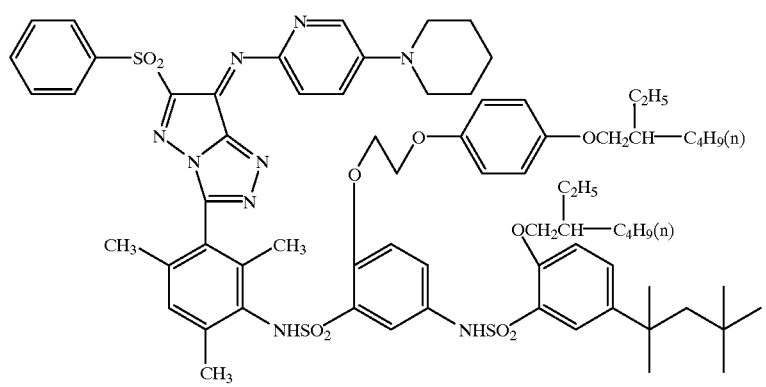
I-37)
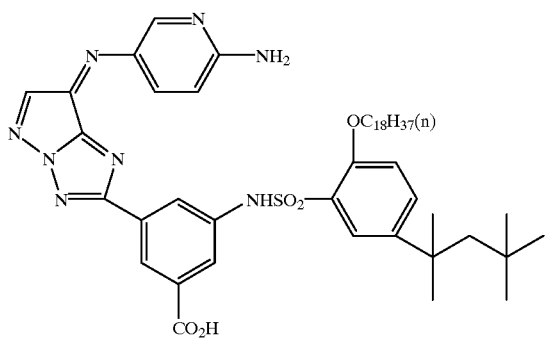
I-38)
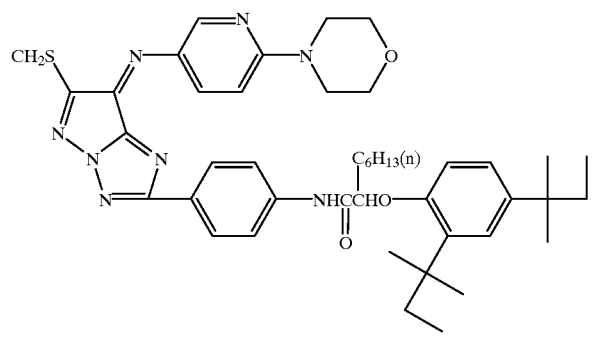
I-39)
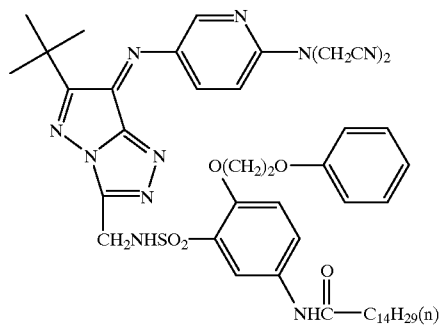
I-40)
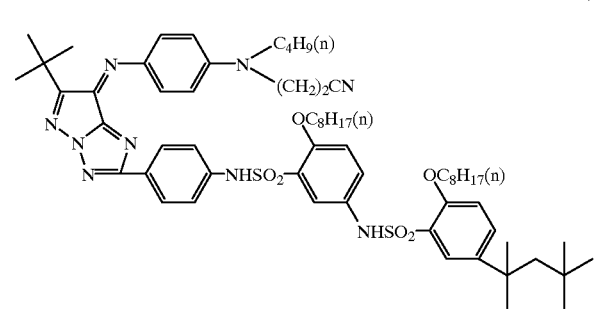

-continued
I-41)
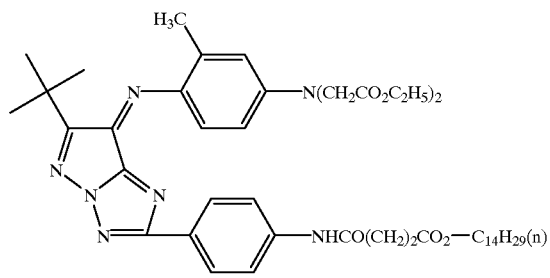
I-42)
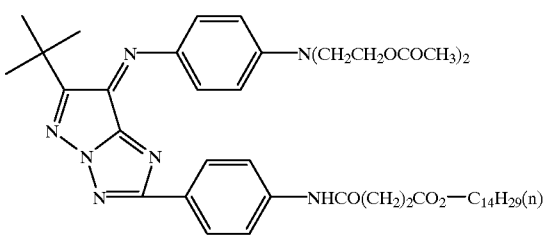
I-43)
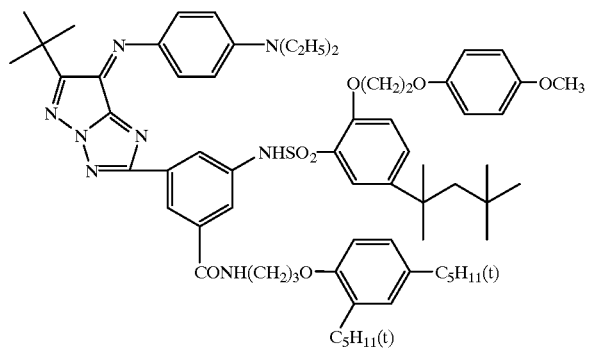
I-44)
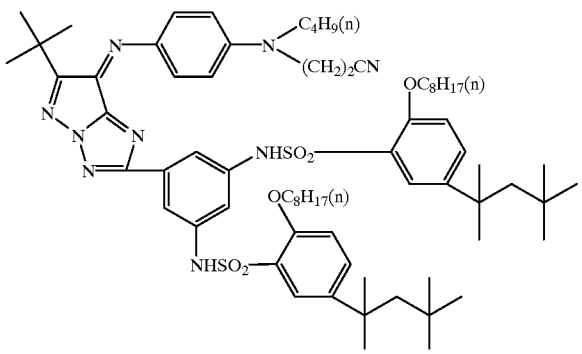
I-45)
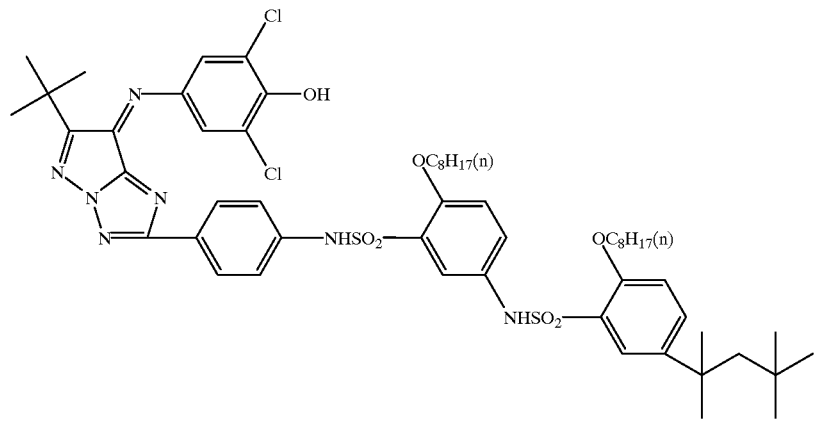
I-46)
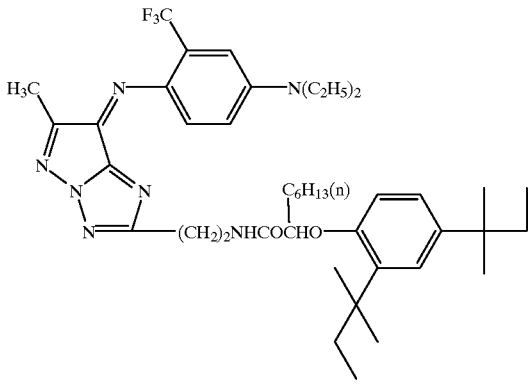
I-47)
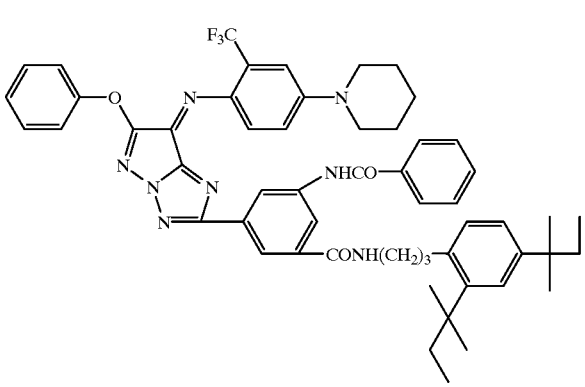

-continued
I-48)
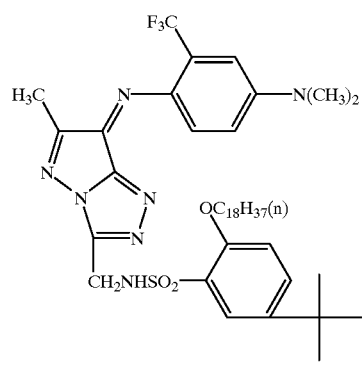
I-49)
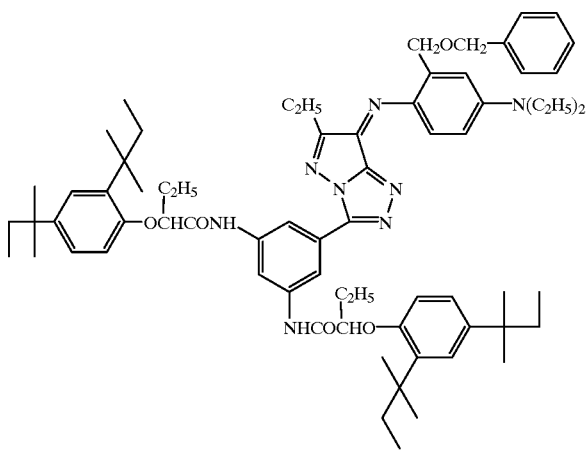
I-50)
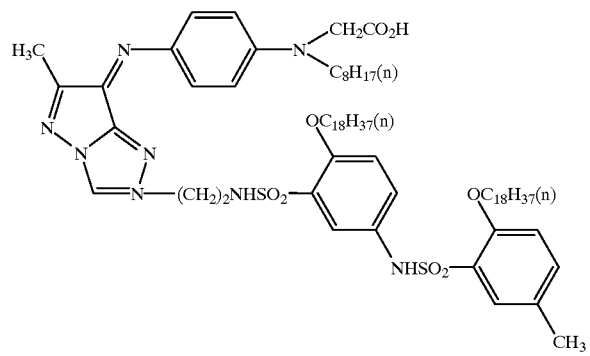
I-51)
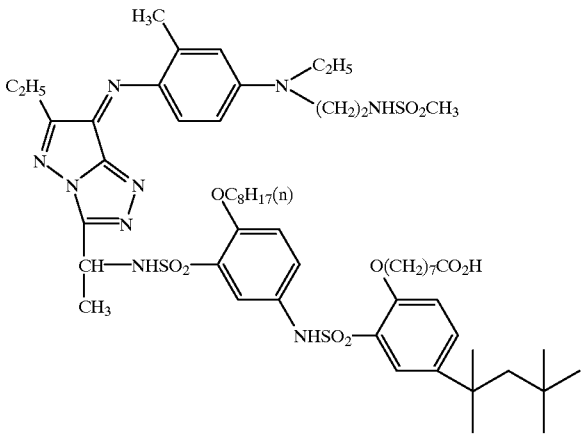
I-52)
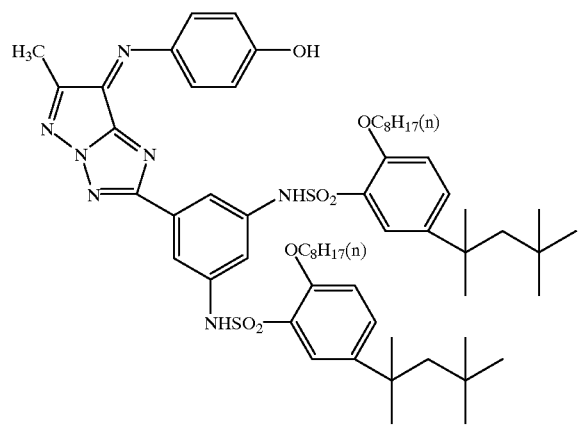

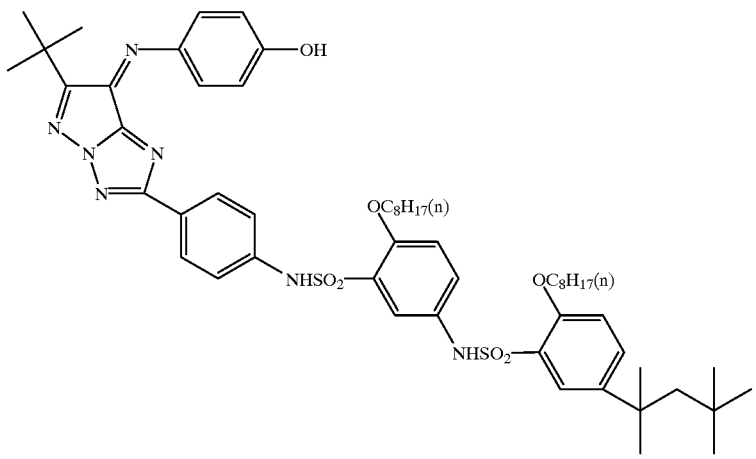

I-53)

Among the compounds described above, those of the formula (2-1) above include (I-2), (I-3), (I-4), (I-5), (I-6), (I-7), (I-8), (I-10), (I-13), (I-14), (I-16), (I-17), (I-19), (I-20), (I-22), (I-23), (I-24), (I-29), (I-31), (I-32), (I-33), (I-38), (I-39), (I-41) and (I-42). The compounds of the formula (2-2) above include (I-3), (I-46), (I-47), (I-48) and (I-49). The compounds of the formulae (2-3a) and (2-3b) above include (I-12), (I-15), (I-21), (I-30), (I-37), (I-43), (I-44), (I-47), (I-49) and (I-52). The compounds of the formula (2-4) above include (I-1), (I-3), (I-4), (I-5), (I-11), (I-13), (I-15), (I-18), (I-21), (I-22), (I-24), (I-25), (I-26), (I-27), (I-28), (I-30), (I-32), (I-34), (I-35), (I-36), (I-40), (I-44), (I-45), (I-50), (I-51), (I-52) and (I-53). The compounds of the formula (2-5) above include (I-9), (I-12), (I-50) and (I-51).

The compounds (azomethine coloring matter) represented by formula (1) above can be synthesized according to a method described in e.g. JP-A 4-126772 and JP-B 7-94180. Those compounds of formula (1) wherein X is —N═ and Y is —C($R^8$)═ can be synthesized according to a method described in e.g. JP-B 7-14941, JP-B 7-100705 and JP-A 3-184980. Further, those compounds of formula (1) wherein X is —C($R^8$)═ and Y is —N═ can be synthesized according to a method described in e.g. JP-A 5-127328, JP-A 3-15842 and U.S. Pat. No. 3,725,067.

Polymer

The coloring composition contains a polymer selected from the group polyurethane, polyester, polyamide, polyurea and polycarbonate. These may be used singly or in combination thereof.

The polymer may be water-insoluble, water-dispersible (self-emulsifiable) or water-soluble, among which the water-dispersible polymer and the water-insoluble polymer are preferable for easy production; and the water-dispersible polymer is preferable for dispersion stability of coloring particulates.

The water-dispersible polymer may be an ionic polymer, a nonionic dispersible group-containing polymer, and a mixed polymer thereof.

The ionic polymer includes polymers having cationic groups such as tertiary amino group and quaternary ammonium group, as well as polymers having anionic groups in carboxylic acid, sulfonic acid etc.

The nonionic dispersible group-containing polymer includes polymers containing nonionic dispersible groups such as polyethylene oxy group.

Among these, the anionic group-containing ionic polymers, nonionic dispersible group-containing polymers and mixed polymers thereof are preferable for dispersion stability of coloring particulates.

Polyurethane

The polyurethane may be synthesized generally by poly-addition reaction of a diol compound with a diisocyanate compound as the starting materials.

The diol compound includes non-dissociable diols and ionic diols.

The non-dissociable diols include e.g. ethylene glycol, 1,2-propanediol, 1,3-propanediol, 1,2-butanediol, 1,3-butanediol, 2,3-butanediol, 2,2-dimethyl-1,3-propanediol, 1,2-pentanediol, 1,4-pentanediol, 1,5-pentanediol, 2,4-pentanediol, 3,3-dimethyl-1,2-butanediol, 2-ethyl-2-methyl-1,3-propanediol, 1,2-hexanediol, 1,5-hexanediol, 1,6-hexanediol, 2,5-hexanediol, 2-methyl-2,4-pentanediol, 2,2-diethyl-1,3-propanediol, 2,4-dimethyl-2,4-pentanediol, 1,7-heptanediol, 2-methyl-2-propyl-1,3-propanediol, 2,5-dimethyl-2,5-hexanediol, 2-ethyl-1,3-hexanediol, 1,2-octanediol, 1,8-octanediol, 2,2,4-trimethyl-1,3-pentanediol, 1,4-cyclohexane dimethanol, hydroquinone, diethylene glycol, triethylene glycol, dipropylene glycol, tripropylene glycol, polyethylene glycol (average molecular weight=200, 300, 400, 600, 1000, 1500, 4000), polypropylene glycol (average molecular weight=200, 400, 1000), polyester polyol, 4,4'-dihydroxy-diphenyl-2,2-propane, and 4,4'-dihydroxyphenyl sulfone.

The ionic diols have ionic groups, and these are used for the purpose of imparting the ability to produce coloring particulates as well as the dispersion stability thereof.

Preferable examples of ionic groups in the ionic diols include anionic groups such as carboxyl group, sulfonic acid group, monosulfate group, —OPO(OH)$_2$, sulfinic acid group, and salts thereof (e.g., salts of alkali metals such as Na and K, ammonia, and ammonium salts such dimethylamine, ethanolamine, diethanolamine, triethanolamine and trimethylamine) and cationic groups such as primary, secondary, tertiary amine and quaternary ammonium salts.

Among these, the anionic groups are preferable among which the carboxyl group is particularly preferable.

The anionic group-containing diols described above include e.g. 2,2-bis(hydroxymethyl) propionic acid, 2,2-bis(hydroxymethyl) butanoic acid, 2,5,6-trimethoxy-3,4-dihydroxyhexanoic acid, 2,3-dihydroxy-4,5- dimethoxypentanoic acid and 3,5-di(2-hydroxy) ethyloxycarbonyl benzene sulfonic acid as well as salts thereof.

The diisocyanates described above include e.g. methylene diisocyanate, ethylene diisocyanate, isophorone diisocyanate, hexamethylene diisocyanate, 1,4-cyclohexane diisocyanate, 2,4-toluene diisocyanate, 2,6-toluene diisocyanate, 1,3-xylylene diisocyanate, 1,5-naphthalene diisocyanate, m-phenylene diisocyanate, p-phenylene diisocyanate, 3,3'-dimethyl-4,4'-diphenyl methane diisocyanate, 3,3'-dimethyl biphenylene diisocyanate, 4,4'-biphenylene diisocyanate, dicyclohexyl methane diisocyanate, and methylenebis(4-cyclohexyl isocyanate).

As the diol compound and the diisocyanate compound each, one kind of compound may be used, or two or more kinds of compounds may be used in an arbitrary ratio depending on the objects (e.g. regulation of glass transition temperature (Tg) of the polymer, solubility thereof, compatibility thereof with dyes, and stability of the dispersion).

Polyester

The polyester above may be synthesized generally by dehydration condensation between a dicarboxylic acid compound and a diol compound.

The dicarboxylic acid compound includes e.g. ionic group-free dicarboxylic acids other than carboxylic acids and derivatives thereof, as well as ionic group-containing dicarboxylic acids other than carboxylic acids.

Preferable examples of the ionic group-free dicarboxylic acids other than carboxylic acids and derivatives thereof include oxalic acid, malonic acid, succinic acid, glutaric acid, dimethyl malonic acid, adipic acid, pimelic acid, α,α-dimethyl succinic acid, acetone dicarboxylic acid, sebacic acid, 1,9-nonane dicarboxylic acid, fumaric acid, maleic acid, itaconic acid, citraconic acid, phthalic acid, isophthalic acid, terephthalic acid, 2-butyl terephthalic acid, tetrachloroterephthalic acid, acetylene dicarboxylic acid, poly (ethylene terephthalate) dicarboxylic acid, 1,2-cyclohexane dicarboxylic acid, 1,4-cyclohexane dicarboxylic acid, ω-poly(ethylene oxide) dicarboxylic acid, and p-xylylene dicarboxylic acid.

For polycondensation reaction with a diol compound, alkyl dicarboxylate (e.g., dimethyl dicarboxylate), dicarboxylic acid chloride, or acid anhydride (such as maleic anhydride, succinic anhydride and phthalic anhydride) can be used as a dicarboxlyic acid compound.

The ionic group-containing dicarboxylic acids other than carboxylic acids include e.g. those having anionic group and/or cationic group as the ionic group.

The anionic group includes e.g. anionic groups such as sulfonic acid group, monosulfate group, $-OPO(OH)_2$, sulfinic acid group, and salts thereof (e.g., salts of alkali metals such as Na and K, ammonia, and ammonium salts such as dimethylamine, ethanolamine, diethanolamine, triethanolarnine and trimethylamine). The cationic group includes e.g. primary, secondary and tertiary amine and quaternary ammonium salts. Among these groups, the anionic groups are preferable among which the sulfonic acid group is particularly preferable.

Preferable examples of the sulfonic acid group-containing dicarboxylic acid and diol compounds include sulfophthalic acids (3-sulfophthalic acid, 4-sulfophthalic acid, 4-sulfoisophthalic acid, 5-sulfoiosophthalic acid, 2-sulfoterephthalic acid), sulfosuccinic acid, sulfonaphthalene dicarboxylic acids (4-sulfo-1,8-naphthalene dicarboxylic acid, 7-sulfo-1,5-naphthalene dicarboxylic acid etc.) and 3,5-di(2-hydroxy) ethyloxycarbonyl benzene sulfonic acid as well as salts thereof.

As the diol compound, the same diol compounds as those described above for the starting materials of the polyurethane can be mentioned.

Typical methods of synthesizing the polyester described above include a method of condensation reaction of the diol compound with the dicarboxylic acid or a derivative thereof, a method of condensation of hydroxycarboxylic acids (e.g., 12-hydroxystearic acid), a method of ring-opening polymerization of a cyclic ether with a lactone (detailed in Lecture 6 on Polymerization Reaction, Ring-Opening Polymerization (I) (in Japanese), authored by Takeo Saegusa (Kagaku Dojin, 1971).

As the dicarboxylic acid and the diol compound each, one kind of compound may be used or two or more kinds of compounds may be used in combination in an arbitrary ratio depending on various objects (e.g. regulation of glass transition temperature (Tg) of the polymer, solubility thereof, compatibility thereof with dyes, and stability of the dispersion).

Polyamide

The polyamide may be obtained by polycondensation of a diamine compound with a dicarboxylic acid compound, by polycondensation of aminocarboxylic acid compounds, or by ring-opening polymerization of monomers such as lactams.

The diamine compound includes e.g. ethyleenediamine, 1,3-propanediamine, 1,2-propanediamine, hexamethylenediamine, octamethylenediamine, o-phenylenediamine, m-phenylenediamine, p-phenylenediamine, piperazine, 2,5-dimethyl piperazine, 4,4'-diaminodiphenyl ether, 3,3'-diaminodiphenyl sulfone, xylylenediamine, etc.

As the dicarboxylic acid compound described above, the same dicarboxylic acid compounds as those described above for the starting materials of the polyester can be mentioned.

The aminocarboxylic acid compound described above includes e.g. glycine, alanine, phenylalanine, ω-aminohexanoic acid, ω-aminodecanoic acid, ω-aminoundecanoic acid and anthranilic acid.

The monomer used in the ring-opening polymerization described above includes e.g. ε-caprolactam, azetidinone and pyrrolidone.

As the diamine compound, the dicarboxylic acid compound, the arninocarboxylic acid compound and the monomer described above each, one kind of compound may be used or two or more kinds of compounds may be used in combination in an arbitrary ratio depending on various objects (e.g. regulation of glass transition temperature (Tg) of the polymer, solubility thereof, compatibility thereof with dyes, and stability of the dispersion).

Polyurea

The polyurea may be obtained generally by polyaddition reaction of a diamine compound with a diisocyanate compound or by ammonia-eliminating reaction of the diamine compound with urea.

As the diamine compound, the same diamine compounds as those described above for the starting materials of the polyamide can be mentioned. As the diisocyanate compound, the same diisocyanate compounds as those described above for the starting materials of the polyurethane can be mentioned.

As the diamine compound and the diisocyanate compound each, one kind of compound may be used or two or more kinds of compounds may be used in combination in an arbitrary ratio depending on various objects (e.g. regulation of glass transition temperature (Tg) of the polymer, solubility thereof, compatibility thereof with dyes, and stability of the dispersion).

Polycarbonate

The polycarbonate may be obtained generally by reacting a diol compound with phosgene or a carbonate derivative (e.g., aromatic esters such as diphenyl carbonate etc.).

As the diol compound, the same diol compounds as those described above for the starting materials of the polyurethane can be mentioned.

As the diol compound, phosgene and the carbonate derivative each, one kind of compound may be used or two or more kinds of compounds may be used in combination in an arbitrary ratio depending on various objects (e.g. regulation of glass transition temperature (Tg) of the polymer, solubility thereof, compatibility thereof with dyes, and stability of the dispersion).

The polymers described above are preferably the polymers containing ionic group, more preferably the polymers containing carboxyl group and/or sulfonic acid group as the ionic group, particularly preferably the polymers containing carboxyl group.

The ionic group in the ionic group-containing polymer may be introduced as a substituent group from a polymer main chain, such as in the ionic diol for synthesis of the polyurethane; the ionic group may, as an unreacted terminal of the dicarboxylic acid compound, remain at the terminal of the polyester; or after polymerization of the polymer, the ionic group may be introduced by allowing a compound which upon reaction with an acid hydride (e.g., maleic anhydride) etc., can introduce the ionic group into a reactive group such as —OH group, amino group etc. remaining at the terminal of the polymer, and there is no limit to the mode of such introduction.

The content of the ionic group in the ionic group-containing polymer described above is preferably 0.01 to 3 mmol/g, more preferably 0.1 to 3 mmol/g, and most preferably 0.2 to 2 mmol/g.

If the content of the ionic group is less than 0.1 mmol/g, the self-emulsification ability of the polymer is decreased, whereas if the content is more than 3 mmol/g, the polymer tends to have high water-solubility, thus making it inappropriate for dispersion of dyes.

The polymers described above are particularly preferably the polyurethane and polyester for impartment of compatibility with the oil-soluble dyes, impartment of excellent dispersion stability, and easy introduction of ionic groups.

For synthesis of the polymer described above, it is possible to use known methods described in "Polymer Experiment (Volume 5) Polycondensation and Polyaddition (in Japanese) (edited by Amane Kamihara and published by Kyoritz Shuppan Co., Ltd. (1980)", "Polyester Resin Handbook (in Japanese) (edited by Eiichiro Takiyama and published by The Nikkan Kogyo Shimbum Ltd. (1988))", "Polyurethane Resin Handbook (in Japanese) (edited by Keiji Iwata and published by The Nikkan Kogyo Shimbum Ltd. (1987))", "Experimental Methods in Polymer Synthesis (coauthored by Takayuki Ohzu & Masaetsu Kinoshita and published by Kagaku Dojin (1972))", Japanese Patent Application Publication (JF-B) No. 33-1141, JP-B No. 37-7641, JP-B No. 39-5989, JP-B No. 40-27349, JP-B No. 42-5118, JP-B No. 42-24194, JP-B No. 45-10957, JP-B No. 48-25435, JP-B No. 49-36942, JP-B No. 52-81344, JP-A No. 56-88454, JP-A No. 6-340835, etc.

Examples P-1) to P-22) and p-24) to p-33) of the polymer described above are exemplified in the form of their staring monomers, P-23) and P-34) to p-38) are exemplified in the form of their polymer. Every acidic group in each polymer is shown in a non-dissociated form, and regardless of the starting materials, all the components of those polymers such as polyester, polyamide etc. formed by condensation reaction are shown in the form of dicarboxylic acid, diol, diamine, dihydroxycarboxylic acid and aminocarboxylic acid. The ratio in the parentheses means mass ratio. These examples are not intended to limit the present invention.

P-1) Toluene diisocyanate/ethylene glycol/1,4-butanediol (50/15/35)

P-2) 4,4'-Diphenyl methane diisocyanate/1,3-propanediol/propylene glycol (Mw=1000) (50/45/5)

P-3) Toluene diisocyanate/hexamethylene diisocyanate/ethylene glycol/polyethylene glycol (Mw=600)/1,4-butanediol (40/10/20/10/20)

P-4) 1,5-Naphthylene diisocyanate/hexamethylene diisocyanate/diethylene glycol/1,6-hexanediol (25/25/35/15)

P-5) 4,4'-Diphenyl methane diisocyanate/hexamethylene diisocyanate/tetraethylene glycol/ethylene glycol/2,2-bis(hydroxymethyl) propionic acid (40/10/20/20/10)

P-6) 4,4'-Diphenyl methane diisocyanate/hexamethylene diisocyanate/butanediol/ethylene glycol (Mw=400)/2,2-bis(hydroxymethyl) propionic acid (40/10/20/10/20)

P-7) 1,5-Naphthylene diisocyanate/butanediol/4,4'-dihydroxy-diphenyl-2,2'-propane/polypropylene glycol (Mw=400)/2,2-bis(hydroxymethyl) propionic acid (50/20/5/10/15)

P-8) 1,5-Naphthylene diisocyanate/hexamethylene diisocyanate/2,2-bis(hydroxymethyl) butanoic acid/polybutylene oxide (Mw=500) (35/15/25/25)

P-9) Isophorone diisocyanate/diethylene glycol/neopentyl glycol/2,2-bis(hydroxymethyl) propionic acid (50/20/20/10)

P-10) Toluene diisocyanate/2,2-bis(hydroxymethyl) butanoic acid/polyethylene glycol (Mw=1000)/cyclohexane dimethanol (50/10/10/30)

P-11) Diphenyl methane diisocyanate/hexamethylene diisocyanate/tetraethylene glycol/butanediol/3,5-di(2-hydroxy) ethyloxycarbonylbenzene sulfonic acid (40/10/10/33/7)

P-12) Diphenyl methane diisocyanate/hexamethylene diisocyanate/butanediol/ethylene glycol/2,2-bis(hydroxymethyl) butanoic acid/3,5-di(2-hydroxy) ethyloxycarbonylbenzene sulfonic acid (40/10/20/15/10/5)

P-13) Terephthalic acid/isophthalic acid/cyclohexane dimethanol/1,4-butanediol/ethylene glycol (25/25/25/15/10)

P-14) Terephthalic acid/isophthalic acid/4,4'-dihydroxy-diphenyl-2,2-propane/tetraetylene glycol/ethylene glycol (30/20/20/15/15)

P-15) Terephthalic acid/isophthalic acid/cyclohexane dimethanol/neopentyl glycol/diethylene glycol (20/30/25/15/10)

P-16) Terephthalic acid/isophthalic acid/1,4-benzene dimethanol/diethylene glycol/neopentyl glycol (25/25/25/15/10)

P-17) Terephthalic acid/isophthalic acid/5-sulfoisophthalic acid/ethylene glycol/neopentyl glycol (24/24/2/25/25)

P-18) Terephthalic acid/isophthalic acid/5-sulfoisophthalic acid/cyclohexane dimethanol/1,4-butanediol/ethylene glycol (22/22/6/25/15/10)

P-19) Isophthalic acid/5-sulfoisophthalic acid/cyclohexane dimethanol/ethylene glycol (40/10/40/10)

P-20) Cyclohexane dicarboxylic acid/isophthalic acid/3,5-di(2-hydroxy) ethyloxycarbonylbenzene sulfonic acid/cyclohexane dimethanol/ethylene glycol (30/20/5/25/20)

P-21) 11-Aminoundecanoic acid (100)

P-22) 12-Aminododecanoic acid (100)

P-23) A reaction product of poly(12-aminododecanoic acid) and maleic anhydride

P-24) 11-Aminoundecanoic acid/7-aminoheptanoic acid (50/50)
P-25) Hexamethylene diamine/adipic acid (50/50)
P-26) Tetramethylene diamine/adipic acid (50/50)
P-27) Hexamethylene diamine/sebacic acid (50/50)
P-28) N,N-dimethyl ethylene diamine/adipic acid/cyclohexane dicarboxylic acid (50/20/30)
P-29) Toluene diisocyanate/4,4'-diphenyl methane diisocyanate/hexamethylene diamine (30/20/50)
P-30) Nonamethylene diamine/urea (50/50)
P-31) Hexamethylene diamine/nonamethylene diamine/urea (25/25/50)
P-32) Toluene diisocyanate/hexamethylene diamine/2,2-bis (hydroxymethyl) propionic acid (50/40/10)
P-33) 11-Aminoundecanoic acid/hexamethylene diamine/urea (33/33/33)

P-34
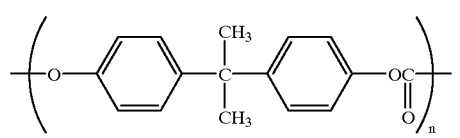

P-35
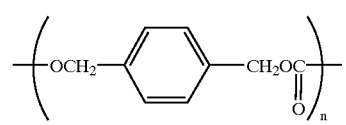

P-36
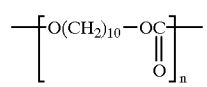

P-37
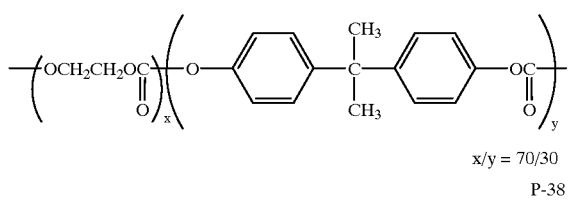
x/y = 70/30

P-38
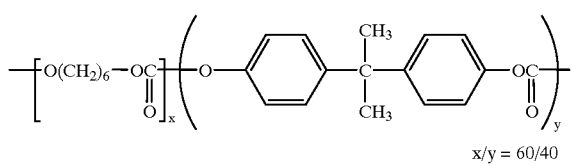
x/y = 60/40

The molecular weight (Mw) of the polymer is usually 1,000 to 200,000, preferably 2,000 to 50,000. If the molecular weight is less than 1,000, there is the tendency that the stability of the coloring compounds is decreased. If the molecular weight is more than 200,000, there is the tendency that the solubility of the polymer in an organic solvent is decreased or the viscosity of its solution in the organic solvent is increased, thus making dispersion thereof difficult.

Production of the Coloring Composition

The coloring composition described above may be produced by dispersing the oil-soluble dye and the polymer in the form of coloring particulates in a water-based dispersion medium (liquid containing at least water). Specifically, a method of preparing a latex of the polymer and impregnating it with the oil-soluble dye, or a method of co-emulsification and dispersion, can be mentioned.

Among these methods, the method of co-emulsification and dispersion is preferable, and the method of co-emulsification and dispersion is preferably a method of emulsifying the organic solvent while dispersing the materials in the form of particulates either by adding water to an organic solvent containing the polymer and the oil-soluble dye or adding said organic solvent to water.

The latex means a dispersion of particulates of the water-insoluble polymer in a dispersion medium. The dispersion may be in any form of the polymer emulsified, dispersed as micelles in the dispersion medium, or dispersed in the form of molecule with a molecular chain having a partially hydrophilic structure in the polymer.

Now, the method of preparing the polymer latex and then impregnating it with the oil-soluble dye is described.

A first example of this method comprises the first step of preparing of a latex of the polymer, the second step of preparing a dye solution having the oil-soluble dye dissolved in an organic solvent, and the third step of mixing the dye solution with the latex of the polymer to prepare a coloring composition.

A second example of this method comprises the step of preparing a latex of the polymer, the second step of preparing a dye solution having the oil-soluble dye dissolved in an organic solvent and mixing this dye solution with a liquid containing at least water to prepare a dispersion of the dye particulates, and the third step of mixing the latex of the polymer and the dispersion of the dye particulates, to prepare a coloring composition.

As a third example of this method, a method described in JP-A No. 55-139471 is mentioned.

Now, the method of co-emulsification and dispersion is described.

A first example of this method comprises the first step of preparing a solution having the oil-soluble dye and the polymer dissolved in an organic solvent and the second step of mixing said organic solvent containing the polymer and the dye with a liquid containing at least water to prepare a coloring composition.

A second example of this method comprises the first step of preparing a dye solution having the oil-soluble dye dissolved in an organic solvent, the second step of preparing a polymer solution having the polymer dissolved in an organic solvent, and the third step of mixing the dye solution and the polymer with a liquid containing at least water to prepare a coloring composition.

A third example of this method comprises the first step of preparing a dye solution having the oil-soluble dye dissolved in an organic solvent and then mixing this dye solution with a liquid containing at least water to prepare a dispersion of the dye particulates, the second step of preparing a polymer solution having the polymer dissolved in an organic solvent and then mixing the polymer solution with a liquid containing at least water to prepare a dispersion of the polymer particulates, and the third step of mixing the dispersion of the dye particulates with the dispersion of the polymer particulates to prepare a coloring composition.

A fourth example of this method comprises the first step of preparing a dye solution having the oil-soluble dye dissolved in an organic solvent and then mixing this dye solution with a liquid containing at least water to prepare a dispersion of the dye particulates, the second step of preparing a polymer solution having the polymer dissolved in an organic solvent, and the third step of mixing the dispersion of the dye particulates and the solution of the polymer to prepare a coloring composition.

A fifth example of this method comprises the step of mixing a liquid containing at least water with the oil-soluble dye and the polymer to directly prepare a coloring composition.

The content of the polymer in the coloring composition is preferably 10 to 1000 mass parts, more preferably 50 to 600 mass parts, relative to 100 mass parts of the oil-soluble dye. If the content of the polymer is less than 10 mass parts, formation of a fine and stable dispersion tends to be difficult, while if the content is more than 1000 mass parts, there is the tendency that the ratio of the oil-soluble dye in the dispersion of the coloring particulates is decreased, thus reducing allowance in compounding design when the dispersion of the coloring particulates is used as an aqueous ink.

The organic solvent used in production of the coloring composition is not particularly limited, and can be selected as necessary depending on the solubility of the oil-soluble dye and the polymer, and mention is made of ketone type solvents such as acetone, methyl ethyl ketone and diethyl ketone; alcohol type solvents such as methanol, ethanol, 2-propanol, 1-propanol, 1-butanol and tert-butanol; chlorine type solvents such as chloroform and methylene chloride; aromatic solvents such as benzene and toluene; ester type solvents such as ethyl acetate, butyl acetate and isopropyl acetate; ether type solvents such as diethyl ether, tetrahydrofuran and dioxane; and glycol ether type solvents such as ethylene glycol monomethyl ether and ethylene glycol dimethyl ether.

These organic solvents may be used singly or in combination thereof. Depending on the solubility of the dye and the polymer, the solvent may be mixed with water prior to use.

The amount of the organic solvent used is not particularly limited insofar as the effect of the present invention is not impaired, but its amount is preferably 10 to 2000 mass parts, more preferably 100 to 1000 mass parts, relative to 100 mass parts of the polymer. If the amount of the organic solvent used is less than 10 mass parts, a fine and stable dispersion of coloring particulates tends to be hardly formed because of higher viscosity of the organic phase, while if it is more than 2000 mass parts, the cumbersome step of desolvation and concentration for removal of the organic solvent is essential, thus reducing allowance in compounding.

If the solubility of the organic solvent in water is 10% or less or the vapor pressure of the organic solvent is larger than that of water, the organic solvent is preferably removed for stability of the dispersion of the coloring particulates.

The organic solvent can be removed at 10 to 100° C. under normal pressures to reduced pressure and preferably at 40 to 100° C. under normal pressures or at 10 to 50° C. under reduced pressure.

The coloring composition may contain additives selected as necessary depending on the object insofar as the effect of the present invention is not impaired.

The additives include e.g. a neutralizing agent, a dispersant and a dispersion stabilizer.

When the polymer has the ionic group not neutralized, the neutralizing agent can be used preferably for pH adjustment of the dispersion of the coloring particulates, for regulation of the self-emulsification ability and for impartment of dispersion stability. The neutralizing agent may be added to the polymer before, during or after preparation of its dispersion.

The neutralizing agent includes organic bases and inorganic alkalis for anionic groups or organic acids and inorganic acids for cationic groups.

Among the neutralizing agents for anionic groups, the organic bases include triethanolamine, diethanolamine, N-methyl diethanolamine and dimethyl ethanolamine, while the inorganic alkalis include alkali metal hydroxides (e.g., sodium hydroxide, lithium hydroxide, potassium hydroxide etc.), carbonates (e.g., sodium carbonate, sodium hydrogen carbonate etc.), and ammonia.

Among the neutralizing agents for cationic groups, the organic acids include acetic acid, propionic acid, trifluoroacetic acid and alkyl sulfonic acid, while the inorganic acids include hydrochloric acid, sulfuric acid and phosphoric acid.

From the viewpoint of improving the dispersion stability of the coloring composition, the neutralizing agent is added so as to adjust the dispersion to pH 4.5–10.0, more preferably pH 6–10.0.

The dispersant and the dispersion stabilizer described above may be added to any one of the polymer latex, the polymer solution, the dye solution and the liquid containing at least water, but these are added preferably to the polymer dispersion and/or the polymer solution, the dye solution or the liquid containing at least water before preparation of the dye particulates dispersion.

The dispersion and the dispersion stabilizer include cationic, anionic and nonionic surfactants, water-soluble or water-dispersible low molecular compounds, oligomers etc.

The amount of the dispersion and the dispersion stabilizer added is 0 to 100% by mass, preferably 0 to 20% by mass, relative to the total amount of the oil-soluble dye and the polymer.

In the coloring particulates described above, the oil-soluble dye is dispersed preferably in the polymer.

The content of the coloring particulates in the coloring composition is preferably 1 to 45% by mass, more preferably 2 to 30% by mass. This content can be regulated as necessary by dilution, evaporation, ultrafiltration etc.

The size of the coloring particulates is preferably 1 to 500 nm, more preferably 3 to 300 nm, most preferably 3 to 200 nm. The distribution of particle sizes is not particularly limited, and may be broad or monodisperse. The particle size and the distribution of particle sizes can be regulated as necessary by means of centrifugation, filtration etc.

The maximum absorption wavelength ($\lambda$max (nm)) of the colored composition of the embodiment is preferably in a wavelength of 510 to 560 nm, more preferably 520 to 550 nm, most preferably 530 to 550 nm. When the maximum absorption wavelength ($\lambda$max (nm)) is in the preferable range, more preferably range and most preferably range described above, color reproduction becomes more excellent and advantageous.

Assuming that the absorbance of the colored composition of the embodiment at the maximum absorption wavelength ($\lambda$max (nm)) is 1, the absorbance of the composition at a wavelength of ($\lambda$max+75 (nm)) is preferably 0.2 or less, more preferably 0.1 or less, most preferably 0.05 or less. In addition, the absorbance of the composition at a wavelength of ($\lambda$max−75 (nm)) is preferably 0.4 or less, more preferably 0.30 or less, most preferably 0.20 or less. When the absorbance of the composition at the wavelength of ($\lambda$max+75 (nm)) and the absorbance thereof at the wavelength of ($\lambda$max−75 (nm)) are in the preferable range, more preferable range and most preferable range described above, color reproduction becomes more excellent and advantageous.

Although the coloring composition of the present invention can be used in various fields, it can be used preferably for writing aqueous ink, aqueous printing ink, information-recording ink etc., particularly preferably for the ink for the ink jet according to the present invention described below.

When the coloring composition is used in ink such as writing aqueous ink, aqueous printing ink, information-recording ink etc., recording materials for the ink are not particularly limited, and may be known materials such as paper, resin-coated paper, paper for exclusive use in ink jet, film, electrophotographic paper, woven goods, glass, metal, ceramic ware etc.

[Ink for Ink Jet and Ink Jet Recording Method]

The ink for the ink jet of the present embodiment contains the coloring composition of the present invention, and contains other components which are appropriately selected as needed.

In the ink jet recording method of the present embodiment, recording is carried out by using the ink for the ink jet of the embodiment. The ink nozzles and the like used at this time are not particularly limited, and can be selected appropriately in accordance with the object.

Other Components

The other components may be included, provided that they are included within a range which does not adversely affect the effects of the present invention.

Examples of the other components are known additives such as drying preventing agents, penetration accelerators, ultraviolet light absorbers, antioxidants, anti-fungal agents, pH adjusters, surface tension adjusting agents, anti-foaming agents, viscosity adjusting agents, dispersion aids, dispersion stabilizers, anti-rusting agents, chelating agents, and the like.

The drying preventing agent is suitably used for the purpose of preventing clogging due to the ink for the ink jet drying at the ink jetting opening of the nozzle used in the ink jet recording method.

The drying preventing agent is preferably a water soluble organic solvent having a vapor pressure which is less than that of water. Specific examples thereof include polyhydric alcohols such as ethylene glycol, propylene glycol, diethylene glycol, polyethylene glycol, thiodiglycol, dithiodiglycol, 2-methyl-1,3-propanediol, 1,2,6-hexanetriol, acetylene glycol derivatives, glycerin, trimethylol propane, and the like; lower alkyl ethers of polyhydric alcohols such as ethylene glycol monomethyl (or ethyl) ether, diethylene glycol monomethyl (or ethyl) ether, triethylene glycol monoethyl (or butyl) ether or the like; heterocyclics such as 2-pyrrolidone, N-methyl-2-pyrrolidone, 1,3-dimethyl-2-imidazolidinone, N-ethylmorpholine and the like; sulfur-containing compounds such as sulfolane, dimethylsulfoxide, 3-sulfolene and the like; polyfunctional compounds such as diacetone alcohol, diethanol amine, and the like; and urea derivatives.

Among these, polyhydric alcohols such as glycerin, diethylene glycol and the like are preferable. A single type of drying preventing agent may be used, or two or more types may be used in combination.

The amount of the drying preventing agent contained in the ink for the ink jet is preferably 10 to 50% by mass.

The penetration accelerator is preferably used for the purpose of better penetration of the ink for the ink jet into paper.

Examples of the penetration accelerator include alcohols such as ethanol, isopropanol, butanol, di(tri)ethylene glycol monobutyl ether, 1,2-hexanediol and the like; sodium lauryl sulfate, sodium oleate, nonionic surfactants, and the like.

The penetration accelerator is contained in a range which does not cause bleeding of the printed characters or print through. If the penetration accelerator is contained in the ink for the ink jet in an amount of 5 to 30% by mass, sufficient effects will usually be exhibited.

The UV light absorber is used for the purpose of improving the storability of images.

Examples of the UV light absorber are the benzotriazole compounds disclosed in JP-A Nos. 58-185677, 61-190537, 2-782, 5-197075, 9-34057, and the like; the benzophenone compounds disclosed in JP-A Nos. 46-2784, 5-194483, U.S. Pat. No. 3,214,463 and the like; the cinnamic acid compounds disclosed in JP-B Nos. 48-30492 and 56-21141, JP-A No. 10-88106 and the like; the triazine compounds disclosed in JP-A Nos. 4-298503, 8-53427, 8-239368, 10-182621, Japanese National Publication No. 8-501291, and the like; the compounds disclosed in Research Disclosure No. 24239; and compounds that absorb ultraviolet light and emit fluorescent light (so-called fluorescent whitening agents) such as stilbene compounds and benzooxazole compounds.

Antioxidants are used for the purpose of improving the storability of images.

For example, any of various types of organic color fading preventing agents and metal complex color fading preventing agents can be used as the antioxidant.

Examples of organic color fading preventing agents are hydroquinones, alkoxyphenols, dialkoxyphenols, phenols, anilines, amines, indanes, chromans, alkoxyanilines, heterocyclics, and the like.

Examples of metal complex color fading preventing agents include nickel complexes and zinc complexes. Specific examples include the compounds disclosed in Research Disclosure No. 17643 (VII, I through I), Research Disclosure No. 15162, Research Disclosure No. 18716 (page 650, left column), Research Disclosure No. 36544 (page 527), Research Disclosure No. 307105 (page 872), the compounds disclosed in the patents cited in Research Disclosure No. 15162, and the compounds included in the compound examples and general formulas of representative compounds disclosed on pages 127 through 137 of JP-A No. 62-215272.

Examples of the anti-fungal agent are sodium dehydroacetate, sodium benzoate, sodium pyridinethion-1-oxide, ethyl p-hydroxybenzoate, 1,2-benzoisothiazoline-3-on, and salts thereof. It is preferable to use the anti-fungal agent in the ink in an amount of 0.02 to 1.00% by mass.

Nonionic, cationic and anionic surfactants are examples of the surface tension adjusting agent.

The surface tension of the ink for the ink jet of the present invention is preferably 25 to 70 mN/m, and more preferably 25 to 60 mN/m. The viscosity of the ink for the ink jet of the present invention is preferably 30 mPa•s or less, and more preferably 20 mPa•s or less.

An anti-foaming agent, for example, a fluorine based or silicone based compound or a chelating agent such as EDTA, can be used if needed.

The ink for the ink jet of the present invention can be suitably used for printing of characters or the like onto a known material to be recorded. The material to be recorded is not particularly limited, but paper used exclusively for ink jets is preferable. Examples of paper used exclusively for ink jets are disclosed in JP-A Nos. 8-169172, 8-27693, 2-276670, 7-276789, 9-323475, 62-238783, 10-153989, 10-217473, 10-235995, 10-337947, 10-217597, 10-337947 and the like.

In the present invention, other than paper used exclusively for ink jets, the following recording papers and recording films are suitably used as the material to be recorded.

The recording paper or recording film is a structure in which a support and an ink receiving layer are layered together, and if necessary, other layers such as a backcoat layer or the like are also layered.

One or more ink receiving layers may be provided. For the other layers as well, one or more of each type of layer may be provided.

Examples of the support include chemical pulp such as LBKP, NBKP and the like; mechanical pulp such as GP, PGW, RMP, TMP, CTMP, CMP, CGP, and the like; and used paper pulp such as DIP or the like. If needed, known pigments, binders, sizing agents, fixing agents, cationic agents, paper strength reinforcing agents and the like may be mixed in with the pulp. The support may be formed by using any type of machine such as a fourdrinier machine, a cylinder machine, or the like.

The support may be a synthetic paper, a plastic film sheet or the like.

The thickness of the support is preferably about 10 to 250 $\mu$m, and the weight thereof is preferably 10 to 250 g/m$^2$.

The ink receiving layer, as well as the backcoat layer which is selected as needed, may be directly laminated onto the support. Alternatively, the ink receiving layer and the backcoat layer may be provided after subjected to size pressing or coating of an undercoat layer by using starch, polyvinyl alcohol or the like.

The support may be subjected to flattening processing by a calendar device such as a machine calendar, a TG calendar, a soft calendar or the like.

Among the substrates, paper whose both surfaces are laminated with polyolefin (e.g., polyethylene, polystyrene, polyethyleneterephthalate, polybutene, and copolymers thereof), and plastic film are preferable. It is more preferable to include in the polyolefin a white pigment (e.g., titanium oxide, zinc oxide) or a hue providing dye (e.g., cobalt blue, ultramarine blue, neodium oxide).

The ink receiving layer includes a pigment, water based binder, mordant, water-proofing agent, light-resistance improving agent, surfactant, and other additives.

As the pigment, a white pigment is preferable.

Examples of the white pigment include inorganic white pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, zinc carbonate, and the like; and organic pigments such as styrene pigments, acrylic pigments, urea resins, melamine resins and the like.

Among these, porous inorganic pigments are preferable, and synthetic amorphous silica whose pores have a large surface area is particularly preferable.

Either silicic anhydride obtained by a dry-type production method or a hydrated silicic acid obtained by a wet-type production method can be used as the synthetic amorphous silica. However, hydrated silicic acid is particularly preferable.

Examples of the water based binder include water soluble polymers such as polyvinyl alcohol, silanol modified polyvinyl alcohol, starch, cationic starch, casein, gelatin, carboxymethyl cellulose, hydroxyethyl cellulose, polyvinylpyrrolidone, polyalkylene oxide, polyalkylene oxide derivatives and the like; water dispersible polymers such as styrene-butadiene latex, acrylic emulsions, and the like; and the like.

One type of water based binder may be used, or two or more types may be used in combination.

Among these, polyvinyl alcohol and silanol modified polyvinyl alcohol are preferable from the standpoints of adhesion to the pigment and separation-resistance of the ink receiving layer.

The mordant is preferably immobilized, and thus, a polymer mordant is preferable.

Examples of polymer mordants are disclosed in JP-A Nos. 48-28325, 54-74430, 54-124726, 55-22766, 55-142339, 60-23850, 60-23851, 60-23852, 60-23853, 60-57836, 60-60643, 60-118834, 60-122940, 60-122941, 60-122942, 60-235134, 1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The polymer mordants disclosed on pages 212 to 215 of JP-A No. 1-161236 are suitably used. It is preferable to use these polymer mordants because images having excellent image quality are obtained and light-resistance of the images is improved.

The water-proofing agent is used for the purpose of making the images waterproof.

Cationic resins are preferable as the water-proofing agent.

Examples of the cationic resin include polyamidepolyamine epichlorohydrine, polyethyleneimine, polyaminesulfone, dimethyldiallyl ammonium chloride polymer, cationic polyacrylamide, and the like. Among these cationic resins, polyamidepolyamine epichlorohydrine is particularly preferable.

The contained amount of the cationic resin is preferably 1 to 15% by mass, and more preferably 3 to 10% by mass, with respect to the total solid content of the ink receiving layer.

Examples of the light-resistance improving agent are zinc sulfate, zinc oxide, hindered amine antioxidants, benzotriazole ultraviolet light absorbers such as benzophenone, and the like. Among these, zinc sulfate is particularly preferable.

The surfactant functions as a coating aid, a detachability improving agent, a slippage improving agent, and an antistatic agent.

Examples of the surfactants are disclosed in JP-A Nos. 62-173463 and 62-183457.

Organic fluoro compounds may be used instead of the surfactant.

It is preferable that the organic fluoro compounds are hydrophobic.

Examples of the organic fluoro compounds are fluorine based surfactants, oily fluorine-based compounds (e.g., fluorine oil), and solid fluorine based compound resins (e.g., tetrafluoroethylene resin), as well as the compounds disclosed in JP-B No. 57-9053 (columns 8 through 17), and JP-A Nos. 61-20994 and 62-135826.

Examples of other additives are pigments dispersion aids, thickeners, anti-foaming agents, dyes, fluorescent whitening agents, preservatives, pH adjusting agents, matte agents, film hardeners, and the like.

The backcoat layer includes a white pigment, a water based binder and other components.

Examples of the white pigments are white inorganic pigments such as light-weight calcium carbonate, heavy-weight calcium carbonate, kaolin, talc, calcium sulfate, barium sulfate, titanium dioxide, zinc oxide, zinc sulfade, zinc carbonate, satin white, aluminum silicate, diatomaceous earth, calcium silicate, magnesium silicate, synthetic amorphous silica, colloidal silica, colloidal alumina, pseudo boehmite, aluminum hydroxide, alumina, lithopone, zeolite, hydrated halloysite, magnesium carbonate, magnesium hydroxide, and the like; and organic pigments such as styrene based plastic pigments, acrylic based plastic pigments, polyethylene, microcapsules, urea resins, melamine resins and the like.

Examples of the water based binder include water soluble polymers such as styrene/maleate salt copolymer, styrene/acrylate salt copolymer, polyvinyl alcohol, silanol modified polyvinyl alcohol, starch, cationized starch, casein, gelatin, carboxymethyl cellulose, hydroxyethyl cellulose, polyvinylpyrrolidone, and the like; water dispersible polymers such as styrene butadiene latex, acrylic emulsion, and the like; and the like.

Examples of the other components are anti-foaming agents, foaming suppressing agents, dyes, fluorescent whitening agents, preservatives, waterproofing agents, and the like.

A polymer latex may be added to each of the layers of the recording paper and the recording film.

The polymer latex is used for the purpose of improving the film properties such as stability of dimensions, prevention of curling, prevention of adhesion, prevention of cracking of the film, and the like.

Examples of the polymer latex are those disclosed in JP-A Nos. 62-245258, 62-1316648 and 62-110066. When a polymer latex having a low glass transition temperature (of 40° C. or less) is added to a layer including the mordant, cracking and curling of the layer can be prevented. Further, by adding a polymer latex having a high glass transition temperature to the backcoat layer, curling can be prevented.

The ink for the ink jet of the embodiment can be applied to any ink jet recording method. For example, the ink for the ink jet can be suitably used in a charge control method in which ink is discharged by utilizing electrostatic attraction; a drop on demand method (pressure pulse method) utilizing the vibration pressure of a piezo element; an acoustic ink jet method in which electric signals are converted to acoustic beams, the beams are applied to the ink, and the emission pressure is utilized so as to discharge the ink; a thermal ink jet (bubble jet) method in which the ink is heated to form air bubbles and the generated pressure is utilized; and the like.

The above ink jet recording methods include a method in which plural drops of an ink, which has a low density and is called a photoink, are expelled in small volumes; a method in which image quality is improved by using plural inks having substantially the same hue and different densities; and a method utilizing a colorless, transparent ink.

EXAMPLES

Synthesis Example 1

Synthesis of Oil-soluble Dye I-3

Compound (I-3) was synthesized according to the following reaction scheme.

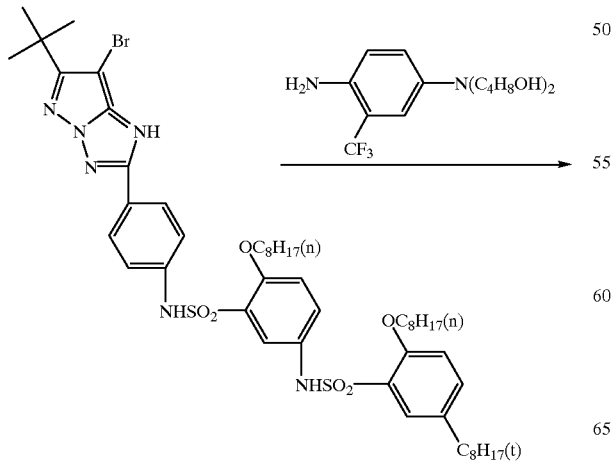

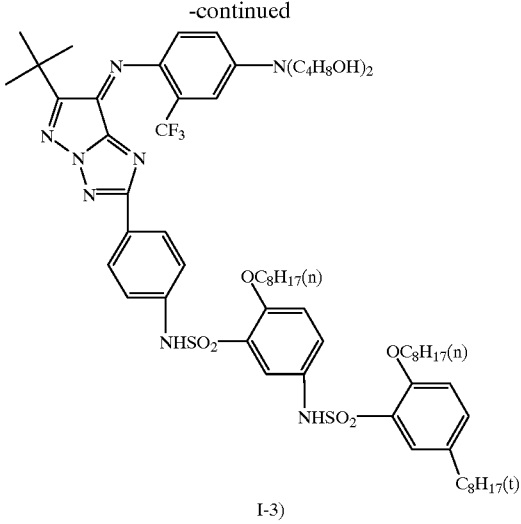

I-3)

99.8 g of a first compound (compound on the left of the arrow in the reaction scheme above), 83.7 ml triethylamine, 1000 ml ethyl acetate and 300 ml N,N-dimethyl acetamide were introduced into a three-necked flask, and then 12.2 g of a second compound (compound over the arrow in the reaction scheme above) was added thereto under stirring at room temperature, followed by adding 3.6 g of N-bromosuccinimide. After the mixture was stirred for 5 minutes, 12.2 g of the second compound was added again, followed by adding 3.6 g of N-bromosuccinimide. Thereafter, the operation of adding 12.2 g of the second compound and then adding 3.6 g of N-bromosuccinimide was conducted repeatedly 4 times. Thereafter, the mixture was stirred at room temperature for 1 hour and then extracted with 700 ml water, and the resulting ethyl acetate layer was washed 5 times with a mixed solution of 600 ml water and 100 ml saturated saline solution. The ethyl acetate layer thus obtained was dried over sodium sulfate anhydride and concentrated in a rotary evaporator. The resulting residues were purified by column chromatography and crystallized from ethyl acetate and n-hexane to give 108.7 g of the desired exemplified compound (I-3) (yield: 88%).

The first compound as the starting material was synthesized by reference to a method described in JP-B 7-14941. The second compound was synthesized by reference to a method described in JP-A 11-12251.

Synthesis Example 2

Synthesis of Oil-soluble Dye I-18

Compound (I-18) was synthesized according to the following reaction scheme.

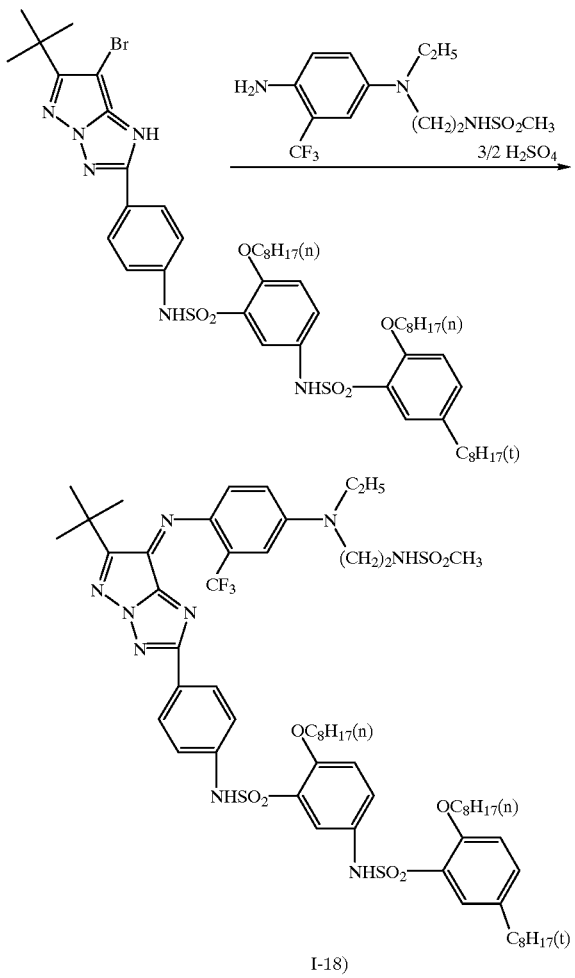

99.8 g of a first compound (compound on the left of the arrow in the reaction scheme above), 52.4 g of a second compound (compound over the arrow in the reaction scheme above), 82.8 g of potassium carbonate, 700 ml ethyl acetate, 350 ml isopropyl alcohol and 580 ml water were introduced into a three-necked flask. While the mixture was stirred at room temperature, an aqueous solution of 27.4 g of ammonium peroxodisulfate in 250 ml water was added dropwise thereto over the period of 20 minutes. Thereafter, the mixture was stirred at room temperature for 1 hour and then extracted with 400 ml water, and the resulting ethyl acetate layer was washed 5 times with a mixed solution of 500 ml water and 100 ml saturated saline solution. The ethyl acetate layer thus obtained was dried over sodium sulfate anhydride and concentrated in a rotary evaporator. The resulting residues were crystallized from acetonitrile to give 113.9 g of the desired exemplified compound (I-18) (yield: 96%).

Synthesis Example 3

Synthesis of Oil-soluble Dye I-25

Compound (I-25) was synthesized according to the following reaction scheme.

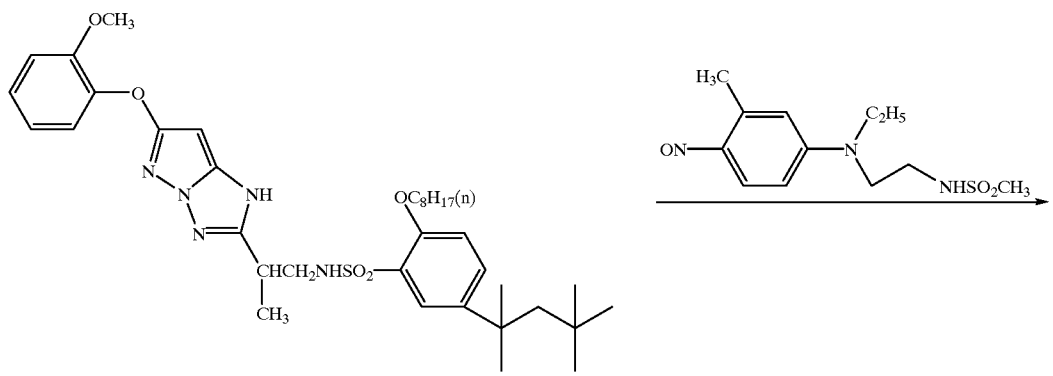

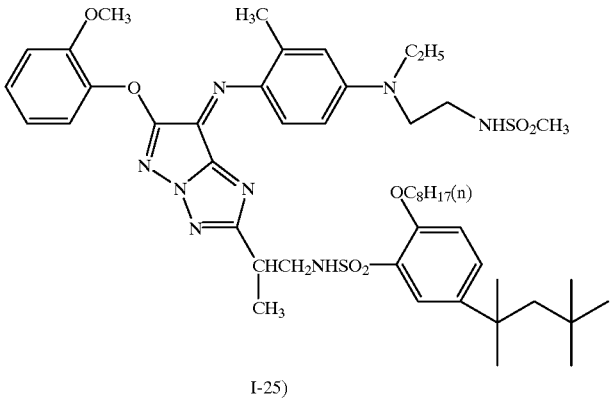

I-25)

66.8 g of a first compound (compound on the left of the arrow in the reaction scheme above), 31.4 g of a second compound (compound over the arrow in the reaction scheme above) and 500 ml ethanol were introduced into a three-necked flask. While the mixture was stirred at room temperature, 15.9 ml acetic anhydride was added dropwise thereto over the period of 10 minutes. Thereafter, the mixture was stirred at room temperature for 4 hours and then extracted with 1000 ml ethyl acetate and 700 ml water, and the resulting ethyl acetate layer was washed 5 times with a mixed solution consisting of 600 ml water and 100 ml saturated saline solution. The ethyl acetate layer thus obtained was dried over sodium sulfate an hydride and concentrated in a rotary evaporator. The resulting residues were purified by column chromatography to give 85.9 g of the desired exemplified compound (I-25) (yield: 92%).

Synthesis Example 4

Synthesis of Oil-soluble Dye I-44

Compound (I-44) was synthesized according to the following reaction scheme.

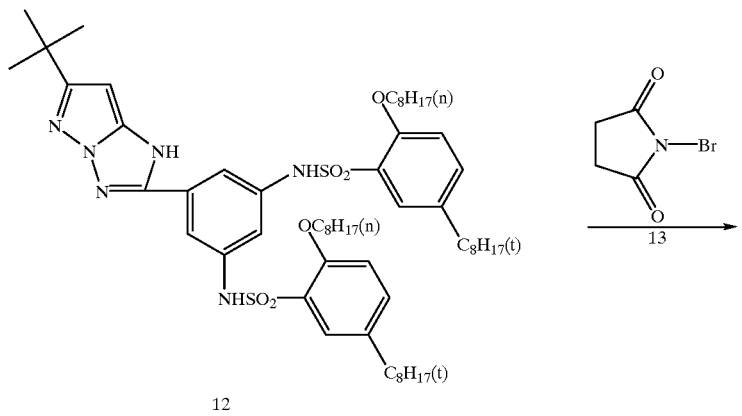

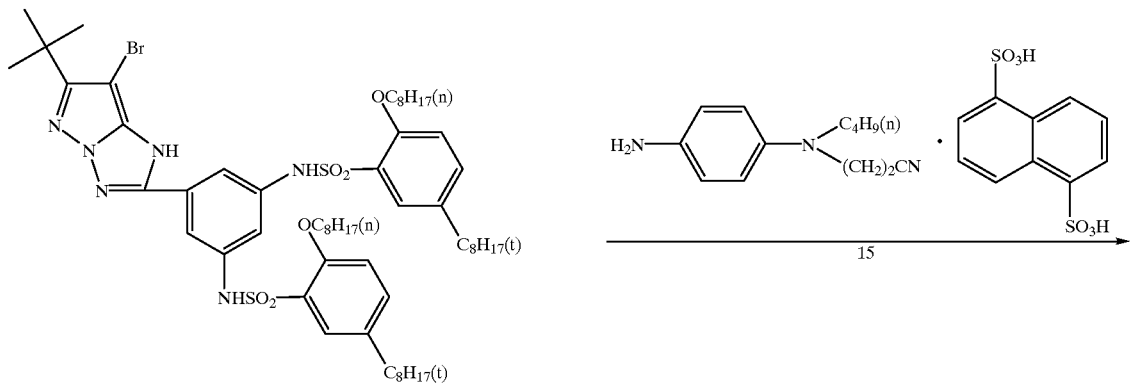

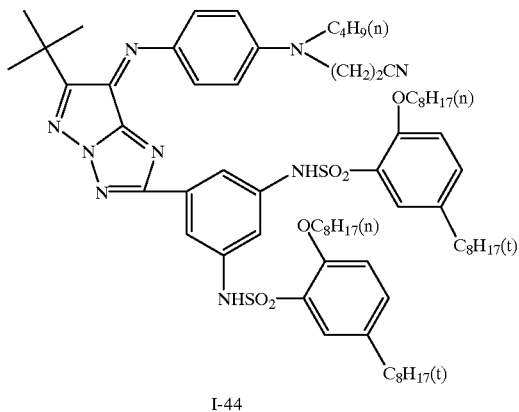

I-44

103.1 g of Compound 12,1600 ml ethyl acetate and 300 ml N,N-dimethylacetamide were introduced into a three-necked flask. 17.8 g of Compound 13 was added thereto under stirring at room temperature, and the mixture was stirred for 1 hour. 83.7 ml triethylamine was added dropwise thereto over the period of 10 minutes, and then 21.5 g of Compound 15 and 5.3 g of Compound 13 were successively added. After the mixture was stirred for 5 minutes, 21.5 g of Comrpound 15 and 5.3 g of Compound 13 were successively added again. Thereafter, the operation of successively adding 21.5 g of Compound 15 and 5.3 g of Compound 13 was conducted repeatedly 3 times, and thereafter the mixture was stirred at room temperature for 1 hour. Then, 1200 ml water was added thereto, and the resulting ethyl acetate layer was washed 5 times with a mixed solution consisting of 800 ml water and 100 ml saturated saline solution. The ethyl acetate layer thus obtained was dried over sodium sulfate anhydride and concentrated in a rotary evaporator. The resulting residues were purified by column chromatography and crystallized from ethyl acetate and n-hexane, to give 105.6 g of the desired exemplified compound (I-44) (yield: 85%).

Compound 12 as the starting material was synthesized according to a method described in JP-A 11-265044.

Synthesis Example 5

Synthesis of Oil-soluble Dye I-50

Compound (I-50) was synthesized according to the following reaction scheme.

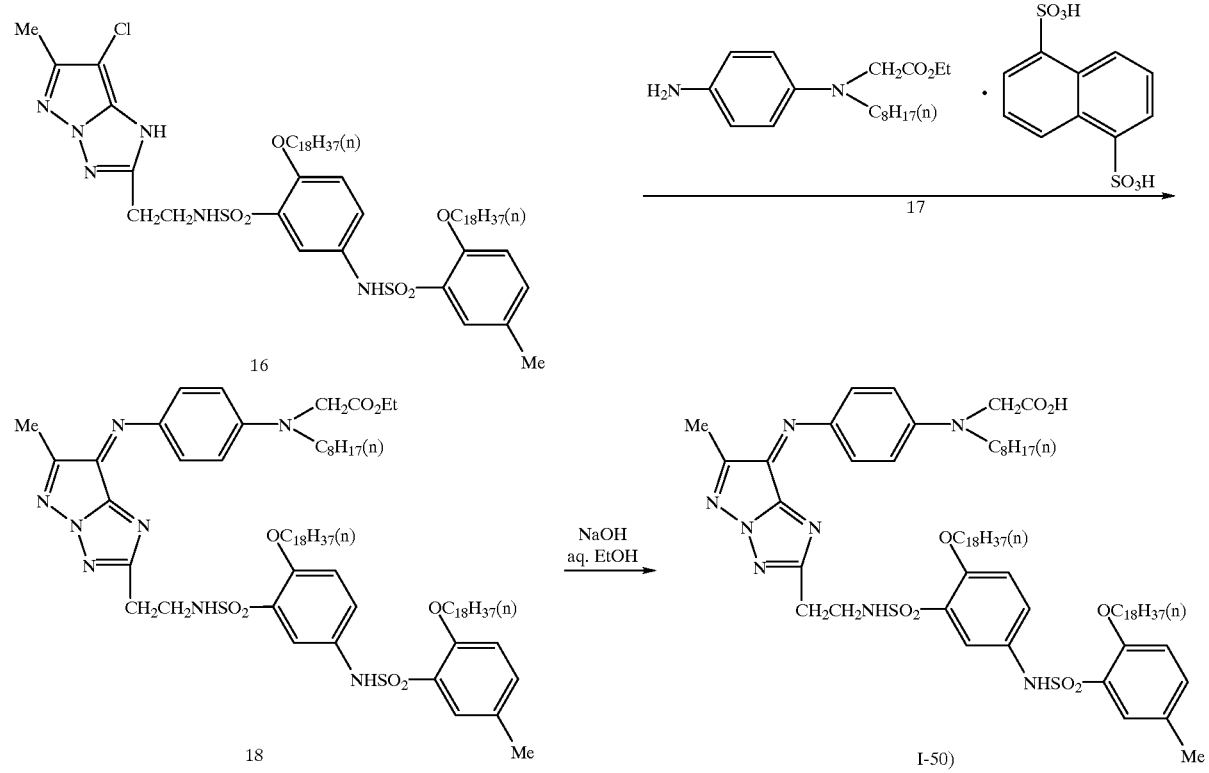

104.6 g of Compound 16, 1000 ml ethyl acetate, 300 ml N,N-dimethylacetamide, 700 ml isopropyl alcohol, 82.9 g potassium carbonate and 800 ml water were introduced into a three-necked flask. 77.3 g of Compound 17 was added thereto at room temperature under stirring, and an aqueous solution of 29.7 g of potassium peroxodisulfate in 200 ml water was added dropwise thereto over the period of 1 hour. Thereafter, the mlixture was stirred for 1 hour and then extracted with 1000 ml ethyl acetate and 1200 ml water, and the resulting ethyl acetate layer was washed 5 times with a mixed solution consisting of 900 ml water and 100 ml saturated saline solution. The ethyl acetate layer thus obtained was dried over sodium sulfate anhydride and concentrated in a rotary evaporator, and the resulting residues were purified by column chromatography to give 120.7 g of Compound 18 (yield: 92%. 65.7 g of Compound 18 thus obtained and 650 ml ethanol were introduced into a three-necked flask and stirred at room temperature, during which an aqueous solution of 10 g sodium hydroxide in 40 ml water was added dropwise over the period of 10 minutes. The mixture was stirred for 2 hours, and the reaction solution was poured into a mixture of 1 kg ice and 21.5 ml hydrochloric acid and then extracted with 1000 ml ethyl acetate. The resulting ethyl acetate layer was washed 5 times with a mixed solution of 600 ml water and 100 ml saturated saline solution. The ethyl acetate layer thus obtained was dried over sodium sulfate anhydride and concentrated in a rotary evaporator. The resulting residues were purified by column chromatography and crystallized from acetonitrile to give 60.5 g of the desired exemplified compound (1–50) (yield: 94%).

The absorption maxima ($\lambda$max), in the visible range, of solutions of some exemplified compounds of the oil-soluble dyes in ethyl acetate, as well as the molar absorption coefficients ($\epsilon$) thereof, are shown in Table 1.

TABLE 1

| Compound No. | Absorption maximum ($\lambda$max) | Molar absorption coefficient ($\epsilon$) |
| --- | --- | --- |
| I-3 | 542.0 nm | $4.51 \times 10^4$ |
| I-4 | 570.3 nm | $4.41 \times 10^4$ |
| I-11 | 532.4 nm | $5.17 \times 10^4$ |
| I-17 | 532.1 nm | $4.77 \times 10^4$ |
| I-18 | 543.6 nm | $5.43 \times 10^4$ |
| I-21 | 538.6 nm | $5.35 \times 10^4$ |
| I-25 | 531.5 nm | $5.45 \times 10^4$ |
| I-26 | 527.8 nm | $5.15 \times 10^4$ |
| I-27 | 522.3 nm | $5.39 \times 10^4$ |
| I-28 | 522.3 nm | $5.39 \times 10^4$ |

Synthesis Example 6

Synthesis of P-5

39.1 g of 4,4'-diphenyl methane diisocyanate, 6.6 g of hexamethylene diisocyanate, 15.2 g of tetraethylene glycol, 4.9 g of ethylene glycol, 5.3 g of 2,2-bis(hydroxymethyl) propionic acid and 150 ml N,N-dimethylacetamide were introduced into a 500 ml three-necked flask equipped with a stirrer and a reflux condenser, and these were dissolved at room temperature under stirring. 0.2 g of tin di-n-butyl dilaurate was added thereto, and the mixture was heated to 90° C., stirred for 6 hours under heating, diluted with 50 ml N,N-dimethylacetamide and cooled to room temperature, followed by adding a solution of 2.2 g sodium methoxide in 100 ml methanol.

The resulting polymer was precipitated by pouring it into 5 L of ethyl acetate/hexane (ratio of 80/20 by volume), then filtered and dried to give 69.5 g of the polymer P-5).

The content of the dissociable group in the resulting polymer P-5) was 0.58 mmol/g, and the weight average molecular weight of the polymer was 9,800.

Synthesis Example 7

Synthesis of P-17

46.5 g of dimethyl terephthalate, 46.5 g of dimethyl isophthalate, 6.0 g of sodium 5-sulfoisophthalate, 30 g of ethylene glycol, 26.0 g of neopentyl glycol, 0.05 g of calcium acetate as a condensation catalyst, and 0.05 g antimony oxide (III) were introduced into a 300 ml three-necked flask equipped with a stirrer and a distillation tube, and while methanol and ethylene glycol formed were distilled off, the mixture was heated under stirring at 150° C. for 30 minutes and further at 190° C. for 1 hour in a nitrogen stream.

Then, the temperature was decreased to about 150° C., and the pressure (reduced pressure) in the reaction system was gradually increased by a pump, and while ethylene glycol was distilled off in the range of 10 to 40 Pa, the reaction solution was heated and reacted at 250° C. for 2.5 hours.

The reaction product was removed and collected to give 120 g of the polymer P-17).

The content of the ionic group in the resulting polymer P-17) was 0.37 mmol/g, and the weight average molecular weight of the polymer was 5,600.

Production Example 1

Preparation of Coloring Composition (A-1)

A mixture of 10 parts of methyl ethyl ketone, 10 parts of isopropyl alcohol, 4.8 parts of the polymer (P-5): sodium salt) and 1.2 parts of the oil-soluble dye (I-11) was heated to 75° C., and 60 parts of water was added thereto under stirring. This solution was concentrated at 40° C. under reduced pressure, to prepare a coloring composition with a solid content of 20%. The size of coloring particulates in the coloring composition was 43 nm in terms of volume average diameter. Hereinafter, this composition is referred to as the coloring composition (A-1).

Production Example 2

Preparation of Coloring Composition (A-2)

A mixture of 10 parts of methyl ethyl ketone, 5 parts of isopropyl alcohol, 3 parts of the polymer (P-5): sodium salt) and 1.2 parts of the oil-soluble dye (I-25) was heated to 60° C. 1 part of 25% aqueous surfactant solution (Emal 20C, a product of Kao Corp.) and 50 parts of water at 60° C. were added thereto, and the mixture was stirred with a homogenizer at a high rate of 5000 rpm for 3 minutes. The resulting solution was concentrated at 40° C. under reduced pressure, to prepare a coloring composition with a solid content of 20%. The size of coloring particulates in the coloring composition was 48 nm in terms of volume average diameter. Hereinafter, this composition is referred to as the coloring composition (A-2).

Production Example 3

Preparation of Coloring Composition (A-4)

A mixture of 6 parts of tetrahydrofuran, 14 parts of isopropyl alcohol, 4.8 parts of the polymer (P-17)) and 1.2 parts of the oil-soluble dye (I-25) was heated to 65° C., and 60 parts of water was added dropwise thereto over the period of 30 minutes under stirring. This solution was concentrated at 40° C. under reduced pressure, to prepare a coloring composition with a solid content of 20%. The size of coloring particulates in the coloring composition was 28 nm in terms of volume average diameter. Hereinafter, this composition is referred to as the coloring composition (A-4).

Production Examples 4 to 9

Preparation of Coloring Compositions (A-3) and (A-5 to 9)

The coloring compositions (A-3) and (A-5) to (A-9) were prepared in the same manner as in Production Examples 1 to 3 except that the polymers and the oil-soluble dyes shown in Table 2 were used.

Production Example 10

Preparation of Comparative Coloring Composition (B-1)

A coloring composition with a solid content of 20% was obtained in the same manner as in Production Example 3 except that the following compound (H-1) was used in place of the oil-soluble dye (I-25). The particle size of the coloring composition was 45 nm in terms of volume average diameter.

Hereinafter, this composition is referred to as the coloring composition (B-1).

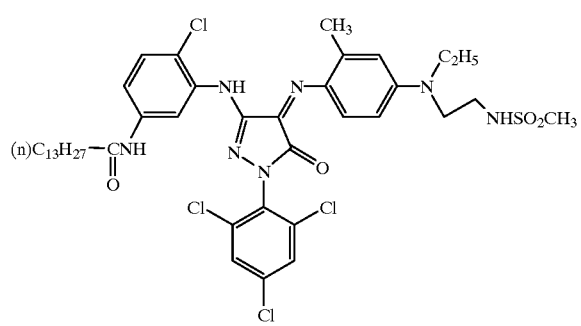

H-1

Example 1

10 parts of diethylene glycol, 8 parts of glycerin, 8 parts of triethylene glycol monobutyl ether, 4 parts of 25% aqueous surfactant solution (Emal 20C, a product of Kao Corp.) and 8 parts of de-ionized water were mixed with 62 parts of the coloring composition (A-1) prepared in Production Example 1 above and filtered with a 0.2 μm filter to prepare an aqueous ink for an ink jet.

Examples 2 to 9

In Example 1, the coloring compositions (A-2) to (A-9) were added in place of the coloring composition (A-1), so that the oil-soluble dye was added in the predetermined amount. Then, 10 parts of diethylene glycol, 8 parts of glycerin, 8 parts of triethylene glycol monobutyl ether and 4 parts of 25% aqueous surfactant (Emal 20C, a product of Kao Corp.) (when the surfactant was previously used for dispersion of the dye, the amount of the surfactant added was regulated so that the same amount of the surfactant was used in total in the respective examples) were added thereto, followed by adding de-ionized water thereto to adjust the total amount to 100 parts. Each solution was filtered through a 0.2 μm filter to prepare each aqueous ink for an ink jet.

Comparative Example 1

An ink for an ink jet was prepared in the same manner as in Example 1 except that the coloring composition (B-1) prepared in Production Example 10 was used in place of the coloring composition (A-1).

Comparative Example 2

10 parts of diethylene glycol, 8 parts of glycerin, 10 parts of tetraethylene glycol monobutyl ether, 1 part of diethanol amine, and 67 parts of de-ioiLzed water were mixed with 4 parts of the following comparative pigment (H-2) and filtered with a 0.2 μm filter, to prepare an ink for an ink jet.

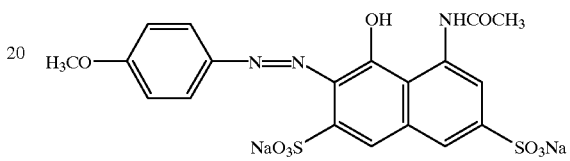

H-2

(Recording and Evaluation of Images)

The inks for ink jetting in the Examples and Comparative Examples described above were evaluated as follows. The results are shown in Table 2.

In Table 2, the item "Absorption of aqueous dispersion" shows the evaluated spectral absorption characteristics of the inks for ink jetting. The items "Color tone", "Dependence on paper", "Water resistance" and "Light resistance" were evaluated after images of each ink for ink jetting were recorded on a photo glossy paper (ink jet paper, photo-grade, from Fuji Photo Film Co., Ltd.) by means of an ink jet printer (PM-700C from EPSON Co., Ltd.). The item "Stability with time" shows the degree of generation of coarse grains evaluated after the ink for ink jetting was left.

<Spectral Absorption Characteristics>

Each ink for ink jetting was diluted with de-ionized water such that the absorbance thereof was reduced to 0.8–1.2. Then, its visible absorption spectrum was taken to determine the absorbance at a shorter wavelength (λmax−75 (nm)) and the absorbance at a longer wavelength (λmax+75 (nm)) respectively. These absorbances were expressed assuming that the absorbance at the maximum absorption wavelength (λmax (nm)) was 1.

<Color Tone>

The recorded image was visually observed, and was judged as either being A (good) or B (poor).

<Dependency on Paper>

The color tone of the image formed on the photo glossy paper and the color tone of an image formed separately on a regular paper for PPC were compared. If the difference between the two images was slight, an evaluation of A (good) was given. If the difference between the two images was great, an evaluation of B (poor) was given.

<Water-Resistance>

The photoglossy paper on which the image was formed was dried at room temperature for one hour. Thereafter, the paper was submerged in water for 30 seconds, was naturally dried at room temperature, and the bleeding thereof was observed. Papers in which there was no bleeding received an evaluation of A, papers in which there was slight bleeding received a B, and papers in which there was much bleeding received a C.

<Light-Resistance>

The photo glossy paper on which the image was formed was irradiated for three days with xenon light (85000 lx) by using a weathermeter (Atlas C. I65). The image densities before and after the xenon illumination were measured by using a reflection densitometer (X-Rite 310TR), and the retention rate of the dye was evaluated. The reflection density was measured at the tlhree points of 1, 1.5 and 2.0. When all of the densities had a dye retention rate of 70% or higher, a mark of A was given. When one or two points had a dye residual rate of less than 70%, the evaluation B was given. When the dye retention rate was less than 70% at all of the densities, the mark of C was given.

<Stability With Time>

The ink for ink jetting was left at 25° C. for 1 month and then filtered though a 0.2 μm filter, and the degree of coloration of the filter was visually evaluated in the following 3 ranks: A (no or less coloration), B (slight coloration) and C (significant coloration).

TABLE 2

| No. | Fine-particle dispersion No. | Polymer | Dye | Ratio of polymer/dye by weight | Diameter of fine particle (nm) | Absorption of aqueous dispersion λmax (nm) | A− | A+ | Color tone | Dependence on paper | Water resistance | Light resistance | Stability with time |
|---|---|---|---|---|---|---|---|---|---|---|---|---|---|
| Example 1 | A-1 | P-5 | I-11 | 4/1 | 43 | 542 | 0.18 | 0.06 | A | A | A | A | A |
| Example 2 | A-2 | P-5 | I-25 | 5/2 | 48 | 544 | 0.19 | 0.07 | A | A | A | A | A |
| Example 3 | A-3 | P-6 | I-18 | 3/1 | 55 | 552 | 0.21 | 0.08 | A | A | A | A | A |
| Example 4 | A-4 | P-17 | I-25 | 4/1 | 28 | 541 | 0.18 | 0.06 | A | A | A | A | A |
| Example 5 | A-5 | P-19 | I-3 | 4/1 | 36 | 550 | 0.19 | 0.06 | A | A | A | A | A |
| Example 6 | A-6 | P-27 | I-21 | 4/1 | 65 | 548 | 0.17 | 0.08 | A | A | A | A | B |
| Example 7 | A-7 | P-32 | I-44 | 4/1 | 35 | 540 | 0.19 | 0.05 | A | A | A | A | A |
| Example 8 | A-8 | P-34 | I-18 | 4/1 | 110 | 553 | 0.19 | 0.07 | A | A | A | A | A |
| Example 9 | A-9 | P-5 | I-51 | 4/1 | 23 | 553 | 0.18 | 0.06 | A | A | A | A | A |
| Comparative example 1 | B-1 | P-17 | H-1 | 4/1 | 45 | 534 | 0.33 | 0.24 | B | B | A | B | C |
| Comparative example 2 | — | — | H-2 | — | — | 536 | 0.41 | 0.03 | A | B | C | B | A |

As is evident from Table 2, the inks for the ink jet according to the Examples were excellent in coloration and color tone, free of dependence on paper, and excellent in water-resistance and light-resistance.

What is claimed is:

1. An ink for an ink jet comprising a coloring composition comprising:
   (a) a dispersion medium; and
   (b) coloring particulates comprising:
      (b-1) a polymer which is selected from the group consisting of polyurethanes, polyesters, polyamides, polyureas and polycarbonates; and
      (b-2) an oil-soluble dye represented by formula (1):

Formula (1)

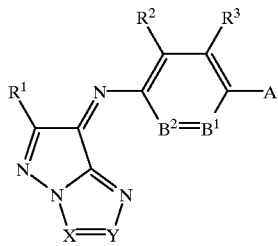

wherein $R^1$ represents a hydrogen atom, aliphatic group, aromatic group, heterocyclic group, cyano, $-OR^{11}$, $-SR^{12}$, $-CO_2R^{13}$, $-OCOR^{14}$, $-NR^{15}R^{16}$, $-CONR^{17}R^{18}$, $-SO_2R^{19}$, $-SO_2NR^{20}R^{21}$, $-NR^{22}CONR^{23}R^{24}$, $-NR^{25}CO_2R^{26}$, $-COR^{27}$, $-NR^{28}COR^{29}$ or $-NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each represents independently a hydrogen atom, aliphatic group or aromatic group; wherein A represents $-NR^4R^5$ or a hydroxyl group, and $R^4$ and $R^5$ each represents independently a hydrogen atom, aliphatic group, aromatic group or heterocyclic group; wherein $B^1$ represents $=C(R^6)-$ or $=N-$ and $B^2$ represents $-C(R^7)=$ or $-N=$; wherein $R^2$, $R^3$, $R^6$ and $R^7$ each represents independently a hydrogen atom, halogen atom, aliphatic group, aromatic group, heterocyclic group, cyano, $-OR^{51}$, $-SR^{52}$, $-CO_2R^{53}$, $-OCOR^{54}$, $-NR^{55}R^{56}$, $-CONR^{57}R^{58}$, $-SO_2R^{59}$, $-SO_2NR^{60}R^{61}$, $-NR^{62}CONR^{63}R^{64}$, $NR^{65}CO_2R^{66}$, $-COR^{67}$, $-NR^{68}COR^{69}$ or $-NR^{70}SO_2R^{71}$, and $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each represents independently a hydrogen atom, aliphatic group or aromatic group; wherein $R^2$ and $R^3$, $R^3$ and $R^4$, $R^4$ and $R^5$, $R^5$ and $R^6$, or $R^6$ and $R^7$ may be mutually bound to form a ring; wherein X and Y each represents independently $C(R^8)=$ or $N=$, $R^8$ represents a hydrogen atom, aliphatic group or aromatic group, either X or Y shall represent $N=$, and X and Y shall not be simultaneously $-N=$; and wherein the formula (1) two or more substituent groups represented by $-NR^{170}SO_2R^{171}$ are present in the dye, and $R^{170}$ and $R^{171}$ each represents independently a hydrogen atom, aliphatic group or aromatic groups, and wherein the polymer and the oil-soluble dye are separate compounds.

2. An ink for an ink jet according to claim 1, wherein the oil-soluble dye is at least one compound represented by any one of formulae (2-1) to (2-5):

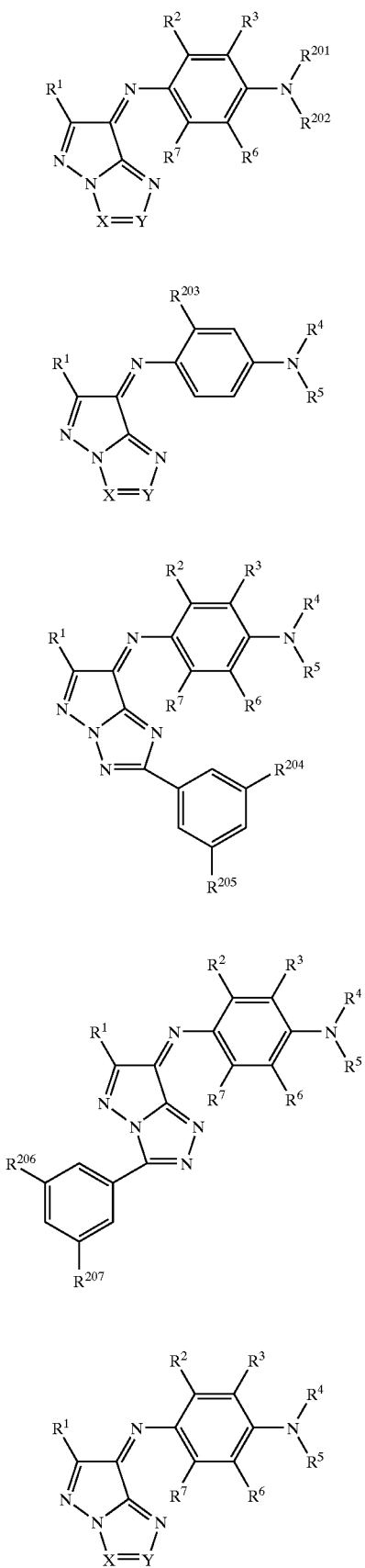

wherein in the formulae (2-1) to (2-5) X, Y, $R^1$, $R^2$, $R^3$, $R^4$, $R^5$, $R^6$, $R^7$ and $R^8$ have the same meanings as defined above in the formula (1); wherein in the formula (2-1) $R^{201}$ and $R^{202}$ each represents a $C_{1-18}$ alkyl group having a substituent group, the substituent group is at least one member selected from the group consisting of a heterocyclic group, cyano, —$OR^{141}$, —$SR^{142}$, —$CO_2R^{143}$, —$OCOR^{144}$, —$NR^{145}R^{146}$, —$CONR^{147}R^{148}$, —$SO_2R^{149}$, —$SO_2NR^{150}R^{151}$, —$NR^{152}CONR^{153}R^{154}$, —$NR^{155}CO_2R^{156}$, —$COR^{157}$, —$NR^{158}COR^{159}$ and —$NR^{160}SO_2R^{161}$, and $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each represents independently a hydrogen atom, aliphatic group or aromatic group; wherein in the formula (2-2) $R^{203}$ represents a $C_{1-10}$ substituted alkyl group; wherein in the formulae (2-3a) and (2-3b), $R^{204}$, $R^{205}$, $R^{206}$ and $R^{207}$ each represents independently a cyano or a group having no more than $C_{100}$ selected from the group consisting of an aliphatic group, aromatic group, heterocyclic group, —$OR^{211}$, —$SR^{212}$, —$CO_2R^{213}$, —$OCOR^{214}$, —$NR^{215}R^{216}$, —$CONR^{217}R^{218}$, —$SO_2R^{219}$, —$SO_2NR^{220}R^{221}$, —$NR^{222}CONR^{223}R^{224}$, —$NR^{225}CO_2R^{226}$, —$COR^{227}$, —$NR^{228}COR^{229}$ and —$NR^{230}SO_2R^{231}$, and $R^{211}$, $R^{212}$, $R^{213}$, $R^{214}$, $R^{215}$, $R^{216}$, $R^{217}$, $R^{218}$, $R^{219}$, $R^{220}$, $R^{221}$, $R^{222}$, $R^{223}$, $R^{224}$, $R^{225}$, $R^{226}$, $R^{227}$, $R^{228}$, $R^{229}$, $R^{230}$ and $R^{231}$ each represents independently a hydrogen atom, aliphatic group or aromatic group; wherein in the formula (2-4) at least one of $R^1$, $R^2$, $R^3$, $R^4$, $R^5$, $R^6$, $R^7$ and $R^8$ has substituent groups represented by —$NR^{271}SO_2R^{272}$, two or more substituent groups represented by —$NR^{271}SO_{272}$ are contained in the dye, and $R^{271}$ and $R^{272}$ each represents independently a hydrogen atom, aliphatic group or aromatic group; and wherein in the formula (2-5) at least one of $R^1$, $R^2$, $R^3$, $R^4$, $R^5$, $R^6$, $R^7$ and $R^8$ has one or more water-soluble groups.

3. An ink for an ink jet according to claim 1, wherein in the formula (1) $R^1$ represents hydrogen, $C_{1-6}$ alkyl group or $C_{1-6}$ substituted alkyl group.

4. An ink for an ink jet according to claim 1, wherein in the formula (1) X is —N= and Y is —$C(R^8)$=.

5. An ink for an ink jet according to claim 1, wherein in the formula (1) $B^1$ is =$C(R^6)$— and $B^2$ is —$C(R^7)$=.

6. An ink for an ink jet according to claim 1, wherein the polymer includes 0.01 to 3.0 mmol/g of an ionic group.

7. An ink for an ink jet according to claim 1, wherein the polymer includes 0.01 to 3.0 mmol/g of a ionic group, and the coloring composition is formed by emulsifying and dispersing coloring particulates which contain said polymer and the oil-soluble dye represented by formula (1) in a water-based dispersion medium.

8. An ink for an ink jet according to claim 1, wherein the polymer contains at least one kind of ionic group selected from carboxyl groups and sulfonate groups.

9. An ink for an ink jet according to claim 1, wherein the polymer is polyurethane or polyester.

10. An ink for an ink jet according to claim 1, wherein the coloring particulates are obtained by emulsifying and making into fine particles an organic solvent which includes the polymer and the oil-soluble dye, by either adding water to the organic solvent, or adding the organic solvent into water.

11. An ink for an ink jet according to claim 1, wherein the ink has a wavelength of maximum absorption ($\lambda_{max}$ (nm)) in a wavelength range from 510 to 560 nm; and when absorbance at $\lambda_{max}$ is regarded as 1, the absorbance is no less than 0.2 at ($\lambda_{max}$+75 nm), and the absorbance is no more than 0.4 at ($\lambda_{max}$−75 nm).

12. An ink for an ink jet according to claim 11, wherein the absorbance is no less than 0.1 at ($\lambda_{max}$+75 nm), and the absorbance is no more than 0.3 at ($\lambda_{max}$−75 nm).

13. The ink for an ink jet according to claim 1, wherein $R^8$ represents a substituted aryl group.

14. A coloring composition comprising:
(a) a dispersion medium; and
(b) coloring particulates comprising:
   (b-1) a polymer which is selected from the group consisting of polyurethanes, polyesters, polyamides, polyureas and polycarbonates; and
   (b-2) an oil-soluble dye represented by formula (1):

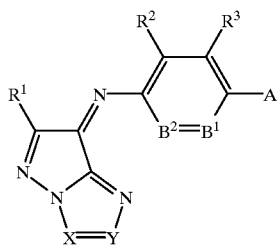

Formula (1)

wherein $R^1$ represents a hydrogen atom, aliphatic group, aromatic group, heterocyclic group, cyano, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$ —$COR^{27}$, —$NR^{28}COR^{29}$—$NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each represents independently a hydrogen atom, aliphatic group or aromatic group; wherein A represents —$NR^4R^5$ or a hydroxyl group, and $R^4$ and $R^5$ each represents independently a hydrogen atom, aliphatic group, aromatic group or heterocyclic group; wherein $B^1$ represents =$C(R^6)$— or =N— and $B^2$ represents —$C(R^7)$= or —N=; wherein $R^2$, $R^3$, $R^6$ and $R^7$ each represents independently a hydrogen atom, halogen atom, aliphatic group, aromatic group, heterocyclic group, cyano, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, $SO_2NR^{60}R^{61}$, —$NR^{62}CONR^{63}R^{64}$, —$NR^{65}CO_2R^{66}$, —$COR^{67}$, —$NR^{68}COR^{69}$—$NR^{70}SO_2R^{71}$, and $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each represents independently a hydrogen atom, aliphatic group or aromatic group; wherein $R^2$ and $R^3$, $R^3$ and $R^4$, $R^4$ and $R^5$, $R^5$ and $R^6$, or $R^6$ and $R^7$ may be mutually bound to form a ring; wherein X and Y each represents independently $C(R^8)$= or N=, $R^8$ represents a hydrogen atom, aliphatic group or aromatic group, either X or Y shall represent N=, and X and Y shall not be simultaneously —N=; and wherein in the formula (1), two or more substituent groups represent by —$NR^{170}SO_2R^{171}$ are present in the dye, and $R^{170}$ and $R^{171}$ each represent independently a hydrogen atom, aliphatic group or aromatic group, and wherein the polymer and oil-soluble dye are separate compounds.

15. A coloring composition according to claim 14, wherein the oil-soluble dye is at least one compound represented by any one of formulae (2-1) to (2-5):

(2-1)

(2-2)

(2-3a)

(2-3b)

(2-4)

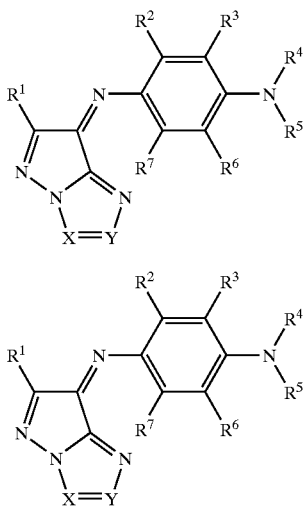

(2-5)

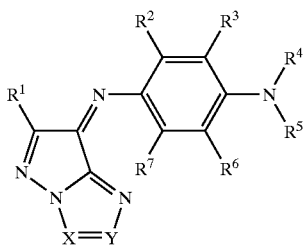

wherein in the formulae (2-1) to (2-5) X, Y, $R^1$, $R^2$, $R^3$, $R^4$, $R^5$, $R^6$, $R^7$ and $R^8$ have the same meanings as defined above in the formula (1); wherein in the formula (2-1) $R^{201}$ and $R^{202}$ each represents a $C_{1-18}$ alkyl group having a substituent group, the substituent group is at least one member selected from the group consisting of a heterocyclic group, cyano, —$OR^{141}$, —$SR^{142}$, —$CO_2R^{143}$, —$OCOR^{144}$, —$NR^{145}R^{146}$, —$CONR^{147}R^{148}$, —$SO_2R^{149}$, —$SO_2NR^{150}R^{151}$, —$NR^{152}CONR^{153}R^{154}$, —$NR^{155}CO_2R^{156}$, —$COR^{157}$, —$NR^{158}COR^{159}$ and —$NR^{160}SO_2R^{161}$, and $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each represents independently a hydrogen atom, aliphatic group or aromatic group; wherein in the formula (2-2) $R^{203}$ represents a $C_{1-10}$ substituted alkyl group; wherein in the formulae (2-3a) and (2-3b), $R^{204}$, $R^{205}$, $R^{206}$ and $R^{207}$ each represents independently a cyano or a group having no more than $C_{100}$ selected from the group consisting of an aliphatic group, aromatic group, heterocyclic group, —$OR^{211}$, —$R^{212}$, —$CO_2R^{213}$, —$OCOR^{214}$, —$NR^{215}R^{216}$, —$CONR^{217}R^{218}$, —$SO_2R^{219}$, —$SO_2NR^{220}R^{221}$, —$NR^{222}CONR^{223}R^{224}$, —$NR^{225}CO_2R^{226}$, —$COR^{227}$, —$NR^{228}COR^{229}$ and —$NR^{230}SO_2R^{231}$, and $R^{211}$, $R^{212}$, $R^{213}$, $R^{214}$, $R^{215}$, $R^{216}$, $R^{217}$, $R^{218}$, $R^{219}$, $R^{220}$, $R^{221}$, $R^{222}$, $R^{223}$, $R^{224}$, $R^{225}$, $R^{226}$, $R^{227}$, $R^{228}$, $R^{229}$, $R^{230}$ and $R^{231}$ each represents independently a hydrogen atom, aliphatic group or aromatic group; wherein in the formula (2-4) at least one of $R^1$, $R^2$, $R^3$, $R^4$, $R^5$, $R^6$, $R^7$ and $R^8$ has substituent groups represented by —$NR^{271}SO_2R^{272}$, two or more substituent groups represented by —$NR^{271}SO_2R^{272}$ are contained in the dye, and $R^{271}$ and $R^{272}$ each represents independently a hydrogen atom, aliphatic group or aromatic group; and wherein in the formula (2-5) at least one of $R^1$, $R^2$, $R^3$, $R^4$, $R^5$, $R^6$, $R^7$ and $R^8$ has one or more water-soluble groups.

16. A coloring composition according to claim 14, wherein the coloring composition has a wavelength of maximum absorption ($\lambda_{max}$ (nm)) in a wavelength range from 510 to 560 nm; and when absorbance at $\lambda_{max}$ is regarded as 1, the absorbance is no less than 0.2 at ($\lambda_{max}$+75 nm), and the absorbance is no more than 0.4 at ($\lambda_{max}$−75 nm).

17. The coloring composition according to claim 14, wherein $R^8$ represents a substituted aryl group.

18. An ink jet recording method comprising the steps of:
(1) preparing an ink for an ink jet; and
(2) using the ink for recording in an ink-jet printing device;
wherein the ink comprising a coloring composition comprising:
(a) a dispersion medium; and
(b) coloring particulates comprising:
(b-1) a polymer which is selected from the group consisting of polyurethanes, polyesters, polyamides, polyureas and polycarbonates; and
(b-2) an oil-soluble dye represented by formula (1):

Formula (1)

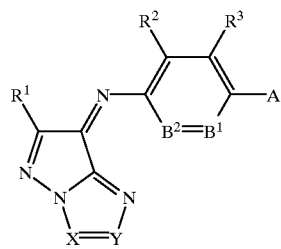

wherein $R^1$ represents a hydrogen atom, aliphatic group, aromatic group, heterocyclic group, cyano, —$OR^{11}$, —$SR^{12}$, —$CO_2R^{13}$, —$OCOR^{14}$, —$NR^{15}R^{16}$, —$CONR^{17}R^{18}$, —$SO_2R^{19}$, —$SO_2NR^{20}R^{21}$, —$NR^{22}CONR^{23}R^{24}$, —$NR^{25}CO_2R^{26}$, —$COR^{27}$, —$NR^{28}COR^{29}$ or —$NR^{30}SO_2R^{31}$, and $R^{11}$, $R^{12}$, $R^{13}$, $R^{14}$, $R^{15}$, $R^{16}$, $R^{17}$, $R^{18}$, $R^{19}$, $R^{20}$, $R^{21}$, $R^{22}$, $R^{23}$, $R^{24}$, $R^{25}$, $R^{26}$, $R^{27}$, $R^{28}$, $R^{29}$, $R^{30}$ and $R^{31}$ each represents independently a hydrogen atom, aliphatic group or aromatic group; wherein A represents —$NR^4R^5$ or a hydroxyl group, and $R^4$ and $R^5$ each represents independently a hydrogen atom, aliphatic group, aromatic group or heterocyclic group; wherein $B^1$ represents $=C(R^6)$— or $=N$— and $B^2$ represents —$C(R^7)=$ or —$N=$; wherein $R^2$, $R^3$, $R^6$ and $R^7$ each represents independently a hydrogen atom, halogen atom, aliphatic group, aromatic group, heterocyclic group, cyano, —$OR^{51}$, —$SR^{52}$, —$CO_2R^{53}$, —$OCOR^{54}$, —$NR^{55}R^{56}$, —$CONR^{57}R^{58}$, —$SO_2R^{59}$, —$SO_2NR^{60}R^{61}$, —$NR^{62}CONR^{63}R^{64}$, —$NR^{65}CO_2R^{66}$, —$COR^{67}$, —$NR^{68}COR^{69}$ or —$NR^{70}SO_2R^{71}$, and $R^{51}$, $R^{52}$, $R^{53}$, $R^{54}$, $R^{55}$, $R^{56}$, $R^{57}$, $R^{58}$, $R^{59}$, $R^{60}$, $R^{61}$, $R^{62}$, $R^{63}$, $R^{64}$, $R^{65}$, $R^{66}$, $R^{67}$, $R^{68}$, $R^{69}$, $R^{70}$ and $R^{71}$ each represents independently a hydrogen atom, aliphatic group or aromatic group; wherein $R^2$ and $R^3$, $R^3$ and $R^4$, $R^4$ and $R^5$, $R^5$ and $R^6$, or $R^6$ and $R^7$ may be mutually bound to form a ring; wherein X and Y each represents independently $C(R^8)=$ or $N=$, $R^8$ represents a hydrogen atom, aliphatic group or aromatic group, either X or Y shall represent $N=$, and X and Y shall not be simultaneously —$N=$; and wherein the formula (1), two or more substituent groups represented by —$NR^{170}SO_2R^{171}$ are presented in the dye, and $R^{170}$ and $R^{171}$ each represents independently a hydrogen atom, aliphatic group or aromatic group,
and wherein the polymer and the oil-soluble dye are separate compounds.

19. An ink jet recording method according to claim 18, wherein the oil-soluble dye is at least one compound represented by any one of formulae (2-1) to (2-5):

wherein in the formulae (2-1) to (2-5) X, Y, $R^1$, $R^2$, $R^3$, $R^4$, $R^5$, $R^6$, $R^7$ and $R^8$ have the same meanings as defined above in the formula (1); wherein in the formula (2-1) $R^{201}$ and $R^{202}$ each represents a $C_{1-18}$ alkyl group having a substituent group, the substituent group is at least one member selected from the group consisting of a heterocyclic group, cyano, —$OR^{141}$, —$SR^{142}$, —$CO_2R^{143}$, —$OCOR^{144}$, —$NR^{145}R^{146}$, —$CONR^{147}R^{148}$, —$SO_2R^{149}$, —$SO_2NR^{150}R^{151}$, —$NR^{152}CONR^{153}R^{154}$, —$NR^{155}CO_2R^{156}$, —$COR^{157}$, —$NR^{158}COR^{159}$ and —$NR^{160}SO_2R^{161}$, and $R^{141}$, $R^{142}$, $R^{143}$, $R^{144}$, $R^{145}$, $R^{146}$, $R^{147}$, $R^{148}$, $R^{149}$, $R^{150}$, $R^{151}$, $R^{152}$, $R^{153}$, $R^{154}$, $R^{155}$, $R^{156}$, $R^{157}$, $R^{158}$, $R^{159}$, $R^{160}$ and $R^{161}$ each represents independently a hydrogen atom, aliphatic group or aromatic group; wherein in the formula (2-2) $R^{203}$ represents a $C_{1-10}$ substituted alkyl group; wherein in the formulae (2-3a) and (2-3b), $R^{204}$, $R^{205}$, $R^{206}$ and $R^{207}$ each represents independently a cyano or a group having no more than $C_{100}$ selected from the group consisting of an aliphatic group, aromatic group, heterocyclic group, —$OR^{211}$, —$SR^{212}$, —$CO_2R^{213}$, —$OCOR^{214}$, —$NR^{215}R^{216}$, —$CONR^{217}R^{218}$, —$SO_2R^{219}$, —$SO_2NR^{220}R^{221}$, —$NR^{222}CONR^{223}R^{224}$, —$NR^{225}CO_2R^{226}$, —$COR^{227}$, —$NR^{228}COR^{229}$ and —$NR^{230}SO_2R^{231}$, and $R^{211}$, $R^{212}$, $R^{213}$, $R^{214}$, $R^{215}$, $R^{216}$, $R^{217}$, $R^{218}$, $R^{219}$, $R^{220}$, $R^{221}$, $R^{222}$, $R^{223}$, $R^{224}$, $R^{225}$, $R^{226}$, $R^{227}$, $R^{228}$, $R^{229}$, $R^{230}$ and $R^{231}$ each represents independently a hydrogen atom, aliphatic group or aromatic group; wherein in the formula (2-4) at least one of $R^1$, $R^2$, $R^3$, $R^4$, $R^5$, $R^6$, $R^7$ and $R^8$ has substituent groups represented by —$NR^{271}SO_2R^{272}$, two or more substituent groups represented by —$NR^{271}SO_2R^{272}$ are contained in the dye, and $R^{271}$ and $R^{272}$ each represents independently a hydrogen atom, aliphatic group or aromatic group; and wherein in the formula (2-5) at least one of $R^1$, $R^2$, $R^3$, $R^4$, $R^5$, $R^6$, $R^7$ and $R^8$ has one or more water-soluble groups.

20. An ink jet recording method according to claim 18, wherein the ink has a wavelength of maximum absorption ($\lambda_{max}$ (nm)) in a wavelength range from 510 to 560 nm; and when absorbance at $\lambda_{max}$ is regarded as 1, the absorbance is no less than 0.2 at ($\lambda_{max}$+75 nm), and the absorbance is no more than 0.4 at ($\lambda_{max}$−75 nm).

21. The ink jet recording method according to claim 18, wherein $R^8$ represents a substituted aryl group.

* * * * *